US012626103B2

(12) United States Patent
Sheoran et al.

(10) Patent No.: US 12,626,103 B2
(45) Date of Patent: May 12, 2026

(54) GEOLOGIC LEARNING FRAMEWORK

(71) Applicant: Schlumberger Technology Corporation, Sugar Land, TX (US)

(72) Inventors: Jagrit Sheoran, Pune (IN); Preetika Shedde, London (GB); Sunil Manikani, Pune (IN)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 522 days.

(21) Appl. No.: 18/546,802

(22) PCT Filed: Feb. 16, 2022

(86) PCT No.: PCT/US2022/070674
§ 371 (c)(1),
(2) Date: Aug. 17, 2023

(87) PCT Pub. No.: WO2022/178507
PCT Pub. Date: Aug. 25, 2022

(65) Prior Publication Data
US 2024/0127039 A1 Apr. 18, 2024

(30) Foreign Application Priority Data
Feb. 18, 2021 (IN) .............................. 202121006902

(51) Int. Cl.
| G06N 20/00 | (2019.01) |
| G06N 3/0455 | (2023.01) |
| G06N 3/088 | (2023.01) |
| G01V 20/00 | (2024.01) |

(52) U.S. Cl.
CPC ........... G06N 3/0455 (2023.01); G06N 3/088 (2013.01); G01V 20/00 (2024.01)

(58) Field of Classification Search
None
See application file for complete search history.

(56) References Cited

U.S. PATENT DOCUMENTS

| 10,158,859 B2 * | 12/2018 | Nowozin | .............. G10L 15/144 |
| 11,042,809 B1 * | 6/2021 | Breckenridge | ....... G06F 18/285 |
| 2017/0270407 A1 * | 9/2017 | Alberti | ..................... G06N 3/08 |
| 2019/0087939 A1 * | 3/2019 | Hakimuddin | .......... G06V 10/82 |

(Continued)

OTHER PUBLICATIONS

Bangoria, B. et al., "A survey on Efficient Enhanced K-Means Clustering Algorithm", International Journal for Scientific Research Development, 2013, 1(9), 3 pages.

(Continued)

*Primary Examiner* — Maung T Lwin
(74) *Attorney, Agent, or Firm* — Kyle R. Miiller

(57) ABSTRACT

A method can include receiving data files, where the data files include different types of content; training an encoder using the data files to generate a trained encoder; compressing each of the data files using the trained encoder to generate a compressed representation of each of the data files; and processing the compressed representations of the data files to generate groups, where each of the groups represents one of the different types of content, where each of the groups includes members, and where each of the members is associated with a corresponding one of the data files.

13 Claims, 15 Drawing Sheets

(56)          References Cited

U.S. PATENT DOCUMENTS

2019/0169962 A1\*   6/2019   Aqrawi ..................... G01V 1/50
2020/0210768 A1\*   7/2020   Turkelson ............. G06T 7/0002

OTHER PUBLICATIONS

Khayatkhoei, M. et al., "Joint Image-Text Clustering using Deep Neural Networks", downloaded from the internet on Dec. 6, 2024 at [https://api.semanticscholar.org/Corpus], 2017, 6 pages.
Lee, et al., "Spatial Assessment of Urban Flood Susceptibility Using Data Mining and Geographic Information System (GIS) Tools", Sustainability, 2018, 10(3), 648, 19 pages.
Mahmoodi et al., "Supervised classification of down-hole physical properties measurements using neural network to predict the lithology", Journal of Applied Geophysics, 2016, 24, pp. 17-26.
Sang, X. et al., "Intelligent High-Resolution Geological Mapping Based on SLIC-CNN", Journal of Geo-Information, 2020, 9(99), 23 pages.
Worden, R. H. et al., "Lower Cretaceous Rodby and Palaeocene Lista Shales: Characterisation and Comparison of Top-Seal Mudstones at Two Planned CCS Sites, Offshore UK", Journal of Minerals, 2020, 10(8), 691, 3 pages.
Yang, S. T. et al., "JECL: Joint Embedding and Cluster Learning for Image-Text Pairs", 25th Internationl Conference on Pattern Recognition, 2021, Milan Italy, 8 pages.
"Zhou et C. al., "A Stratigraphic Prediction Method Based on Machine Learning", Journal of Applied Sciences, 2019, 9(17), 3553, 29 pages."
Search Report and Written Opinion of International Patent Application No. PCT/US2022/070674 dated on May 25, 2022, 9 Pages.
Extended Search Report issued in European Patent Application No. 22757160.1 dated Dec. 16, 2024, 6 pages.

\* cited by examiner

System 100

System 300

Output Space 602

Output Space 604

Train Autoencoder 810

Space Reduction 820

900

1st PC

2nd PC

⊕ Blank          ◐ Passages

● Core sample    ⊘ Plots and Graphs

⊗ Log            ○ Rock

1010

1st t-SNE

1030

1st t-SNE

1100 p2 p1

Method 1300

GEOLOGIC LEARNING FRAMEWORK

CROSS REFERENCE PARAGRAPH

This application is a National Stage Entry of International Application No. PCT/US2022/070674, filed Feb. 16, 2022, which claims the benefit of India Non-Provisional Application No. 202121006902, entitled "Geologic Learning Framework," filed Feb. 18, 2021, the disclosure of which is hereby incorporated herein by reference.

BACKGROUND

A reservoir can be a subsurface formation that can be characterized at least in part by its porosity and fluid permeability. As an example, a reservoir may be part of a basin such as a sedimentary basin. A basin can be a depression (e.g., caused by plate tectonic activity, subsidence, etc.) in which sediments accumulate. As an example, where hydrocarbon source rocks occur in combination with appropriate depth and duration of burial, a petroleum system may develop within a basin, which may form a reservoir that includes hydrocarbon fluids (e.g., oil, gas, etc.).

In oil and gas exploration, geoscientists and engineers may acquire and analyze data to identify and locate various subsurface structures (e.g., horizons, faults, geobodies, etc.) in a geologic environment. Various types of structures (e.g., stratigraphic formations) may be indicative of hydrocarbon traps or flow channels, as may be associated with one or more reservoirs (e.g., fluid reservoirs). In the field of resource extraction, enhancements to interpretation can allow for construction of a more accurate model of a subsurface region, which, in turn, may improve characterization of the subsurface region for purposes of resource extraction. Characterization of one or more subsurface regions in a geologic environment can guide, for example, performance of one or more operations (e.g., field operations, etc.). As an example, a more accurate model of a subsurface region may make a drilling operation more accurate as to a borehole's trajectory where the borehole is to have a trajectory that penetrates a reservoir, etc.

SUMMARY

A method can include receiving data files, where the data files include different types of content; training an encoder using the data files to generate a trained encoder; compressing each of the data files using the trained encoder to generate a compressed representation of each of the data files; and processing the compressed representations of the data files to generate groups, where each of the groups represents one of the different types of content, where each of the groups includes members, and where each of the members is associated with a corresponding one of the data files. A system can include one or more processors; memory accessible to at least one of the one or more processors; processor-executable instructions stored in the memory and executable to instruct the system to: receive data files, where the data files include different types of content; train an encoder using the data files to generate a trained encoder; compress each of the data files using the trained encoder to generate a compressed representation of each of the data files; and process the compressed representations of the data files to generate groups, where each of the groups represents one of the different types of content, where each of the groups includes members, and where each of the members is associated with a corresponding one of the data files. One or more computer-readable storage media can include processor-executable instructions to instruct a computing system to: receive data files, where the data files include different types of content; train an encoder using the data files to generate a trained encoder; compress each of the data files using the trained encoder to generate a compressed representation of each of the data files; and process the compressed representations of the data files to generate groups, where each of the groups represents one of the different types of content, where each of the groups includes members, and where each of the members is associated with a corresponding one of the data files. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

This description is not to be taken in a limiting sense, but rather is made merely for the purpose of describing the general principles of the implementations. The scope of the described implementations should be ascertained with reference to the issued claims.

Figure 1:
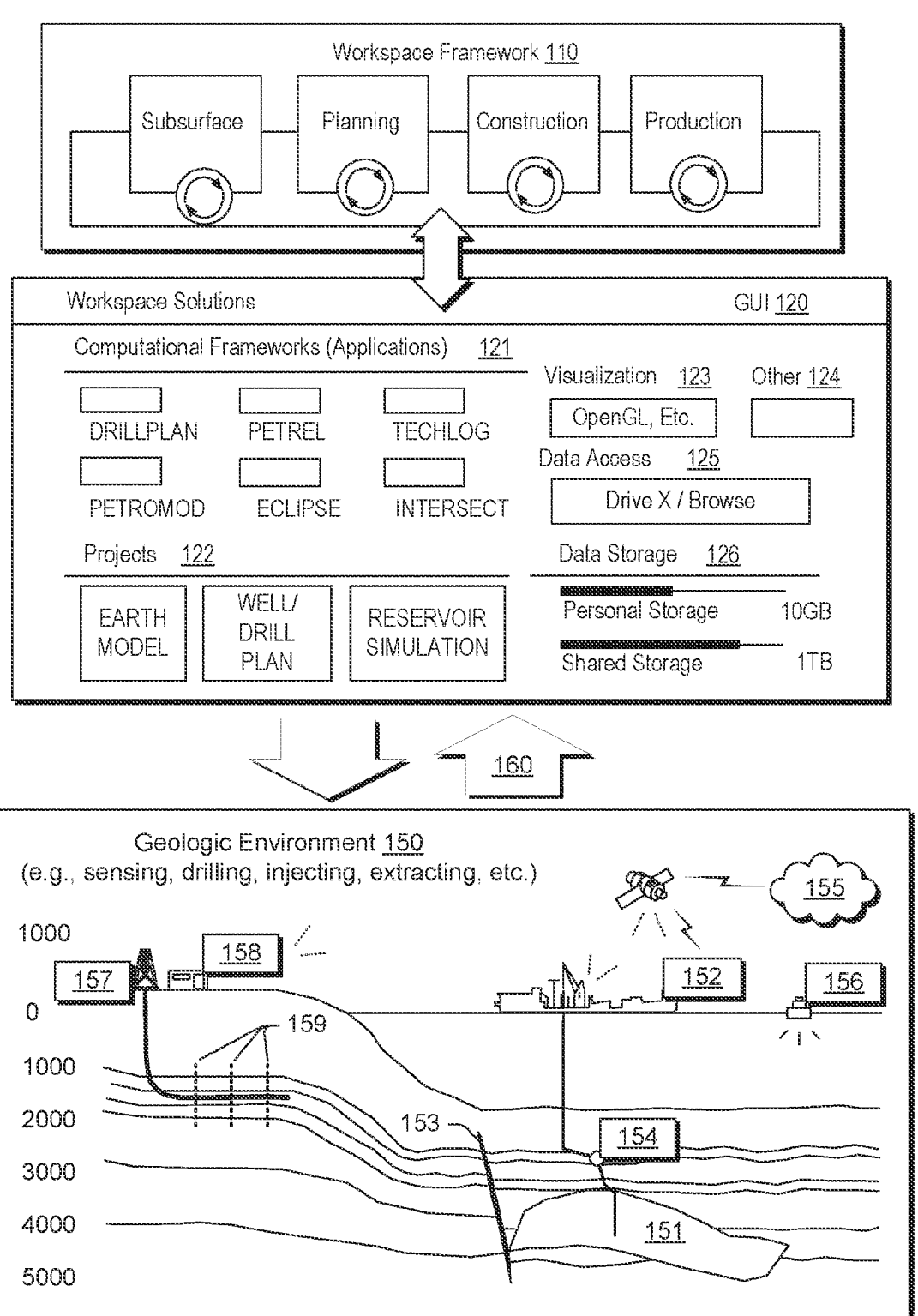
FIG. 1 illustrates an example system that includes various framework components associated with one or more geologic environments.

FIG. 1 shows an example of a system 100 that includes a workspace framework 110 that can provide for instantiation of, rendering of, interactions with, etc., a graphical user interface (GUI) 120. In the example of FIG. 1, the GUI 120 can include graphical controls for computational frameworks (e.g., applications) 121, projects 122, visualization 123, one or more other features 124, data access 125, and data storage 126.

In the example of FIG. 1, the workspace framework 110 may be tailored to a particular geologic environment such as an example geologic environment 150. For example, the geologic environment 150 may include layers (e.g., strati-fication) that include a reservoir 151 and that may be intersected by a fault 153. As an example, the geologic environment 150 may be outfitted with a variety of sensors, detectors, actuators, etc. For example, equipment 152 may include communication circuitry to receive and to transmit information with respect to one or more networks 155. Such information may include information associated with down-hole equipment 154, which may be equipment to acquire information, to assist with resource recovery, etc. Other equipment 156 may be located remote from a wellsite and include sensing, detecting, emitting or other circuitry. Such equipment may include storage and communication cir-cuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, tempo-ral, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in proper-ties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

In the example of FIG. 1, the GUI 120 shows some examples of computational frameworks, including the DRILLPLAN, PETREL, TECHLOG, PETROMOD, ECLIPSE, and INTERSECT frameworks (Schlumberger Limited, Houston, Texas).

The DRILLPLAN framework provides for digital well construction planning and includes features for automation of repetitive tasks and validation workflows, enabling improved quality drilling programs (e.g., digital drilling plans, etc.) to be produced quickly with assured coherency.

The PETREL framework can be part of the DELFI cognitive E&P environment (Schlumberger Limited, Hous-ton, Texas) for utilization in geosciences and geoengineer-ing, for example, to analyze subsurface data from explora-tion to production of fluid from a reservoir.

The TECHLOG framework can handle and process field and laboratory data for a variety of geologic environments (e.g., deepwater exploration, shale, etc.). The TECHLOG framework can structure wellbore data for analyses, plan-ning, etc.

The PETROMOD framework provides petroleum sys-tems modeling capabilities that can combine one or more of seismic, well, and geological information to model the evolution of a sedimentary basin. The PETROMOD frame-work can predict if, and how, a reservoir has been charged with hydrocarbons, including the source and timing of hydrocarbon generation, migration routes, quantities, and hydrocarbon type in the subsurface or at surface conditions.

The ECLIPSE framework provides a reservoir simulator (e.g., as a computational framework) with numerical solutions for fast and accurate prediction of dynamic behavior for various types of reservoirs and development schemes.

The INTERSECT framework provides a high-resolution reservoir simulator for simulation of detailed geological features and quantification of uncertainties, for example, by creating accurate production scenarios and, with the inte-gration of precise models of the surface facilities and field operations, the INTERSECT framework can produce reli-able results, which may be continuously updated by real-time data exchanges (e.g., from one or more types of data acquisition equipment in the field that can acquire data during one or more types of field operations, etc.). The INTERSECT framework can provide completion configu-rations for complex wells where such configurations can be built in the field, can provide detailed chemical-enhanced-oil-recovery (EOR) formulations where such formulations can be implemented in the field, can analyze application of steam injection and other thermal EOR techniques for implementation in the field, advanced production controls in terms of reservoir coupling and flexible field management, and flexibility to script customized solutions for improved modeling and field management control. The INTERSECT framework, as with the other example frameworks, may be utilized as part of the DELFI cognitive E&P environment, for example, for rapid simulation of multiple concurrent cases. For example, a workflow may utilize one or more of the DELFI on demand reservoir simulation features.

The aforementioned DELFI environment provides vari-ous features for workflows as to subsurface analysis, plan-ning, construction and production, for example, as illus-trated in the workspace framework 110. As shown in FIG. 1, outputs from the workspace framework 110 can be utilized for directing, controlling, etc., one or more processes in the geologic environment 150 and, feedback 160, can be received via one or more interfaces in one or more forms (e.g., acquired data as to operational conditions, equipment conditions, environment conditions, etc.).

As an example, a workflow may progress to a geology and geophysics ("G&G") service provider, which may generate a well trajectory, which may involve execution of one or more G&G software packages. Examples of such software packages include the PETREL framework. As an example, a system or systems may utilize a framework such as the DELFI framework (Schlumberger Limited, Houston, Texas). Such a framework may operatively couple various other frameworks to provide for a multi-framework work-space. As an example, the GUI 120 of FIG. 1 may be a GUI of the DELFI framework.

In the example of FIG. 1, the visualization features 123 may be implemented via the workspace framework 110, for example, to perform tasks as associated with one or more of subsurface regions, planning operations, constructing wells and/or surface fluid networks, and producing from a reser-voir.

As an example, a visualization process can implement one or more of various features that can be suitable for one or more web applications. For example, a template may involve use of the JAVASCRIPT object notation format (JSON) and/or one or more other languages/formats. As an example, a framework may include one or more converters. For example, consider a JSON to PYTHON converter and/or a PYTHON to JSON converter.

As an example, visualization features can provide for visualization of various earth models, properties, etc., in one or more dimensions. As an example, visualization features can provide for rendering of information in multiple dimen-sions, which may optionally include multiple resolution rendering. In such an example, information being rendered may be associated with one or more frameworks and/or one or more data stores. As an example, visualization features may include one or more control features for control of equipment, which can include, for example, field equipment that can perform one or more field operations. As an example, a workflow may utilize one or more frameworks to generate information that can be utilized to control one or more types of field equipment (e.g., drilling equipment, wireline equipment, fracturing equipment, etc.).

As to a reservoir model that may be suitable for utilization by a simulator, consider acquisition of seismic data as acquired via reflection seismology, which finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks. Such interpretation results can be utilized to plan, simulate, perform, etc., one or more operations for production of fluid from a reservoir (e.g., reservoir rock, etc.).

Field acquisition equipment may be utilized to acquire seismic data, which may be in the form of traces where a trace can include values organized with respect to time and/or depth (e.g., consider 1D, 2D, 3D or 4D seismic data). For example, consider acquisition equipment that acquires digital samples at a rate of one sample per approximately 4 ms. Given a speed of sound in a medium or media, a sample rate may be converted to an approximate distance. For example, the speed of sound in rock may be on the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, a deepest boundary depth may be estimated to be about 10 km (e.g., assuming a speed of sound of about 5 km per second).

As an example, a model may be a simulated version of a geologic environment. As an example, a simulator may include features for simulating physical phenomena in a geologic environment based at least in part on a model or models. A simulator, such as a reservoir simulator, can simulate fluid flow in a geologic environment based at least in part on a model that can be generated via a framework that receives seismic data. A simulator can be a computerized system (e.g., a computing system) that can execute instructions using one or more processors to solve a system of equations that describe physical phenomena subject to various constraints. In such an example, the system of equations may be spatially defined (e.g., numerically discretized) according to a spatial model that includes layers of rock, geobodies, etc., that have corresponding positions that can be based on interpretation of seismic and/or other data. A spatial model may be a cell-based model where cells are defined by a grid (e.g., a mesh). A cell in a cell-based model can represent a physical area or volume in a geologic environment where the cell can be assigned physical properties (e.g., permeability, fluid properties, etc.) that may be germane to one or more physical phenomena (e.g., fluid volume, fluid flow, pressure, etc.). A reservoir simulation model can be a spatial model that may be cell-based.

A simulator can be utilized to simulate the exploitation of a real reservoir, for example, to examine different productions scenarios to find an optimal one before production or further production occurs. A reservoir simulator does not provide an exact replica of flow in and production from a reservoir at least in part because the description of the reservoir and the boundary conditions for the equations for flow in a porous rock are generally known with an amount of uncertainty. Certain types of physical phenomena occur at a spatial scale that can be relatively small compared to size of a field. A balance can be struck between model scale and computational resources that results in model cell sizes being of the order of meters; rather than a lesser size (e.g., a level of detail of pores). A modeling and simulation workflow for multiphase flow in porous media (e.g., reservoir rock, etc.) can include generalizing real micro-scale data from macro scale observations (e.g., seismic data and well data) and upscaling to a manageable scale and problem size. Uncertainties can exist in input data and solution procedure such that simulation results too are to some extent uncertain. A process known as history matching can involve comparing simulation results to actual field data acquired during production of fluid from a field. Information gleaned from history matching, can provide for adjustments to a model, data, etc., which can help to increase accuracy of simulation.

As an example, a simulator may utilize various types of constructs, which may be referred to as entities. Entities may include earth entities or geological objects such as wells, surfaces, reservoirs, etc. Entities can include virtual representations of actual physical entities that may be reconstructed for purposes of simulation. Entities may include entities based on data acquired via sensing, observation, etc. (e.g., consider entities based at least in part on seismic data and/or other information). As an example, an entity may be characterized by one or more properties (e.g., a geometrical pillar grid entity of an earth model may be characterized by a porosity property, etc.). Such properties may represent one or more measurements (e.g., acquired data), calculations, etc.

As an example, a simulator may utilize an object-based software framework, which may include entities based on pre-defined classes to facilitate modeling and simulation. As an example, an object class can encapsulate reusable code and associated data structures. Object classes can be used to instantiate object instances for use by a program, script, etc. For example, borehole classes may define objects for representing boreholes based on well data. A model of a basin, a reservoir, etc. may include one or more boreholes where a borehole may be, for example, for measurements, injection, production, etc. As an example, a borehole may be a wellbore of a well, which may be a completed well (e.g., for production of a resource from a reservoir, for injection of material, etc.).

While several simulators are illustrated in the example of FIG. 1, one or more other simulators may be utilized, additionally or alternatively. For example, consider the VISAGE geomechanics simulator (Schlumberger Limited, Houston Texas) or the PIPESIM network simulator (Schlumberger Limited, Houston Texas), etc. The VISAGE simulator includes finite element numerical solvers that may provide simulation results such as, for example, results as to compaction and subsidence of a geologic environment, well and completion integrity in a geologic environment, caprock and fault-seal integrity in a geologic environment, fracture behavior in a geologic environment, thermal recovery in a geologic environment, $CO_2$ disposal, etc. The PIPESIM simulator includes solvers that may provide simulation results such as, for example, multiphase flow results (e.g., from a reservoir to a wellhead and beyond, etc.), flowline and surface facility performance, etc. The PIPESIM simulator may be integrated, for example, with the AVOCET production operations framework (Schlumberger Limited, Houston Texas). As an example, a reservoir or reservoirs may be simulated with respect to one or more enhanced recovery techniques (e.g., consider a thermal process such as steam-assisted gravity drainage (SAGD), etc.). As an example, the PIPESIM simulator may be an optimizer that can optimize one or more operational scenarios at least in part via simulation of physical phenomena. The MAN-GROVE simulator (Schlumberger Limited, Houston, Texas) provides for optimization of stimulation design (e.g., stimulation treatment operations such as hydraulic fracturing) in a reservoir-centric environment. The MANGROVE framework can combine scientific and experimental work to predict geomechanical propagation of hydraulic fractures, reactivation of natural fractures, etc., along with production forecasts within 3D reservoir models (e.g., production from a drainage area of a reservoir where fluid moves via one or more types of fractures to a well and/or from a well). The MANGROVE framework can provide results pertaining to heterogeneous interactions between hydraulic and natural fracture networks, which may assist with optimization of the number and location of fracture treatment stages (e.g., stimulation treatment(s)), for example, to increase perforation efficiency and recovery.

The PETREL framework provides components that allow for optimization of exploration and development operations. The PETREL framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes (e.g., with respect to one or more geologic environments, etc.). Such a framework may be considered an application (e.g., executable using one or more devices) and may be considered a data-driven application (e.g., where data is input for purposes of modeling, simulating, etc.).

As mentioned, a framework may be implemented within or in a manner operatively coupled to the DELFI cognitive exploration and production (E&P) environment (Schlumberger, Houston, Texas), which is a secure, cognitive, cloud-based collaborative environment that integrates data and workflows with digital technologies, such as artificial intelligence and machine learning. As an example, such an environment can provide for operations that involve one or more frameworks. The DELFI environment may be referred to as the DELFI framework, which may be a framework of frameworks. As an example, the DELFI framework can include various other frameworks, which can include, for example, one or more types of models (e.g., simulation models, etc.).

Figure 2:
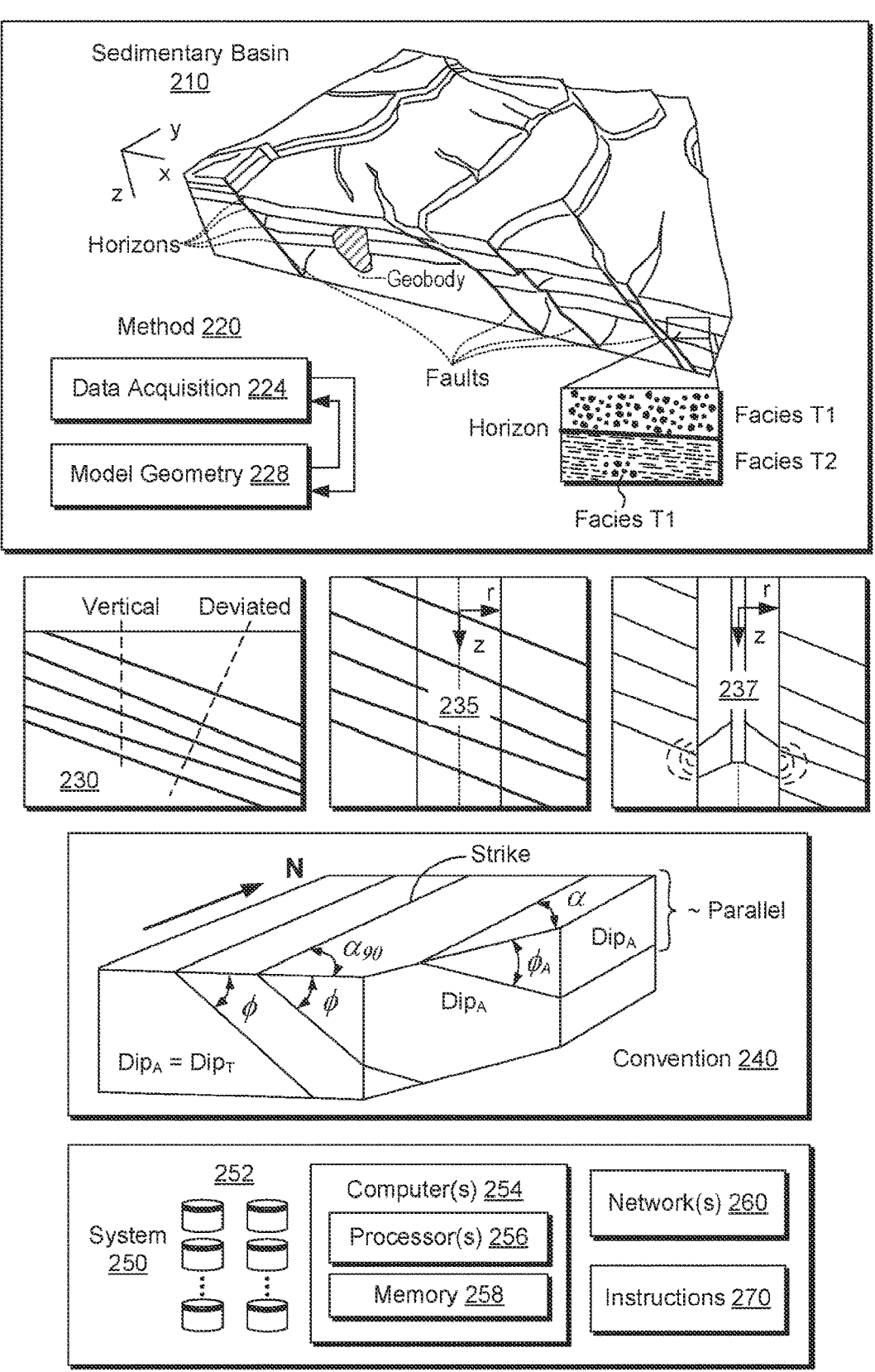
FIG. 2 illustrates examples of a basin, a convention and a system.

FIG. 2 shows an example of a sedimentary basin 210 (e.g., a geologic environment), an example of a method 220 for model building (e.g., for a simulator, etc.), an example of a formation 230, an example of a borehole 235 in a formation, an example of a convention 240 and an example of a system 250.

As an example, data acquisition, reservoir simulation, petroleum systems modeling, etc. may be applied to characterize various types of subsurface environments, including environments such as those of FIG. 1.

In FIG. 2, the sedimentary basin 210, which is a geologic environment, includes horizons, faults, one or more geobodies and facies formed over some period of geologic time. These features are distributed in two or three dimensions in space, for example, with respect to a Cartesian coordinate system (e.g., x, y and z) or other coordinate system (e.g., cylindrical, spherical, etc.). As shown, the model building method 220 includes a data acquisition block 224 and a model geometry block 228. Some data may be involved in building an initial model and, thereafter, the model may optionally be updated in response to model output, changes in time, physical phenomena, additional data, etc. As an example, data for modeling may include one or more of the following: depth or thickness maps and fault geometries and timing from seismic, remote-sensing, electromagnetic, gravity, outcrop and well log data. Furthermore, data may include depth and thickness maps stemming from facies variations (e.g., due to seismic unconformities) assumed to following geological events ("iso" times) and data may include lateral facies variations (e.g., due to lateral variation in sedimentation characteristics).

To proceed to modeling of geological processes, data may be provided, for example, data such as geochemical data (e.g., temperature, kerogen type, organic richness, etc.), timing data (e.g., from paleontology, radiometric dating, magnetic reversals, rock and fluid properties, etc.) and boundary condition data (e.g., heat-flow history, surface temperature, paleowater depth, etc.).

In basin and petroleum systems modeling, quantities such as temperature, pressure and porosity distributions within the sediments may be modeled, for example, by solving partial differential equations (PDEs) using one or more numerical techniques. Modeling may also model geometry with respect to time, for example, to account for changes stemming from geological events (e.g., deposition of material, erosion of material, shifting of material, etc.).

As shown in FIG. 2, the formation 230 includes a horizontal surface and various subsurface layers. As an example, a borehole may be vertical. As another example, a borehole may be deviated. In the example of FIG. 2, the borehole 235 may be considered a vertical borehole, for example, where the z-axis extends downwardly normal to the horizontal surface of the formation 230. As an example, a tool 237 may be positioned in a borehole, for example, to acquire information. As mentioned, a borehole tool can include one or more sensors that can acquire borehole images via one or more imaging techniques. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

As an example, data can include geochemical data. For example, consider data acquired using X-ray fluorescence (XRF) technology, Fourier transform infrared spectroscopy (FTIR) technology and/or wireline geochemical technology.

As an example, one or more probes may be deployed in a bore via a wireline or wirelines. As an example, a probe may emit energy and receive energy where such energy may be analyzed to help determine mineral composition of rock surrounding a bore. As an example, nuclear magnetic resonance may be implemented (e.g., via a wireline, downhole NMR probe, etc.), for example, to acquire data as to nuclear magnetic properties of elements in a formation (e.g., hydrogen, carbon, phosphorous, etc.).

As an example, lithology scanning technology may be employed to acquire and analyze data. For example, consider the LITHO SCANNER technology marketed by Schlumberger Limited (Houston, Texas). As an example, a LITHO SCANNER tool may be a gamma ray spectroscopy tool.

As an example, a tool may be positioned to acquire information in a portion of a borehole. Analysis of such information may reveal vugs, dissolution planes (e.g., dissolution along bedding planes), stress-related features, dip events, etc. As an example, a tool may acquire information that may help to characterize a fractured reservoir, optionally where fractures may be natural and/or artificial (e.g., hydraulic fractures). Such information may assist with completions, stimulation treatment, etc. As an example, information acquired by a tool may be analyzed using a framework such as the aforementioned TECHLOG framework (Schlumberger Limited, Houston, Texas).

As an example, a workflow may utilize one or more types of data for one or more processes (e.g., stratigraphic modeling, basin modeling, completion designs, drilling, production, injection, etc.). As an example, one or more tools may provide data that can be used in a workflow or workflows that may implement one or more frameworks (e.g., PETREL, TECHLOG, PETROMOD, ECLIPSE, etc.).

As to the convention 240 for dip, as shown in FIG. 2, the three dimensional orientation of a plane can be defined by its dip and strike. Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 240 of FIG. 2, various angles $\phi$ indicate angle of slope downwards, for example, from an imaginary horizontal plane (e.g., flat upper surface); whereas, dip refers to the direction towards which a dipping plane slopes (e.g., which may be given with respect to degrees, compass directions, etc.). Another feature shown in the convention of FIG. 2 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 240 of FIG. 2). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 240 of FIG. 2). Apparent dip may be the dip of a plane as measured in any other direction except in the direction of true dip (see, e.g., $\phi_A$ as $Dip_A$ for angle $\alpha$); however, it is possible that the apparent dip is equal to the true dip (see, e.g., $\phi$ as $Dip_A=Dip_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 240 of FIG. 2, the dip of a plane as seen in a cross-section perpendicular to the strike is true dip (see, e.g., the surface with $\phi$ as $Dip_A=Dip_T$ for angle $\alpha_{90}$ with respect to the strike). As indicated, dip observed in a cross-section in any other direction is apparent dip (see, e.g., surfaces labeled $Dip_A$). Further, as shown in the convention 240 of FIG. 2, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 240 may be used with respect to an analysis, an interpretation, an attribute, etc. As an example, various types of features may be described, in part, by dip (e.g., sedimentary bedding, faults and fractures, cuestas, igneous dikes and sills, metamorphic foliation, etc.). As an example, dip may change spatially as a layer approaches a geobody. For example, consider a salt body that may rise due to various forces (e.g., buoyancy, etc.). In such an example, dip may trend upward as a salt body moves upward.

Seismic interpretation may aim to identify and/or classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As an example, equations may be provided for petroleum expulsion and migration, which may be modeled and simulated, for example, with respect to a period of time. Petroleum migration from a source material (e.g., primary migration or expulsion) may include use of a saturation model where migration-saturation values control expulsion. Determinations as to secondary migration of petroleum (e.g., oil or gas), may include using hydrodynamic potential of fluid and accounting for driving forces that promote fluid flow. Such forces can include buoyancy gradient, pore pressure gradient, and capillary pressure gradient.

As shown in FIG. 2, the system 250 includes one or more information storage devices 252, one or more computers 254, one or more networks 260 and instructions 270. As to the one or more computers 254, each computer may include one or more processors (e.g., or processing cores) 256 and memory 258 for storing instructions, for example, consider the instructions 270 as including instructions executable by at least one of the one or more processors. As an example, a computer may include one or more network interfaces (e.g., wired or wireless), one or more graphics cards (e.g., one or more GPUs, etc.), a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 252. As an example, the system 250 may be local, remote or in part local and in part remote. As to remote resources, consider one or more cloud-based resources (e.g., as part of a cloud platform, etc.).

As an example, the instructions 270 may include instructions (e.g., stored in memory) executable by one or more processors to instruct the system 250 to perform various actions. As an example, the system 250 may be configured such that the instructions 270 provide for establishing one or more aspects of the workspace framework 110 of FIG. 1. As an example, one or more methods, techniques, etc. may be performed at least in part via instructions, which may be, for example, instructions of the instructions 270 of FIG. 2.

As an example, a framework can include various components. For example, a framework can include one or more components for prediction of reservoir performance, one or more components for optimization of an operation or operations, one or more components for control of production engineering operations, etc. As an example, a framework can include components for prediction of reservoir performance, optimization and control of production engineering operations performed at one or more reservoir wells. Such a framework may, for example, allow for implementation of various methods. For example, consider an approach that allows for a combination of physics-based and data-driven methods for modeling and forecasting a reservoir production.

Figure 3:
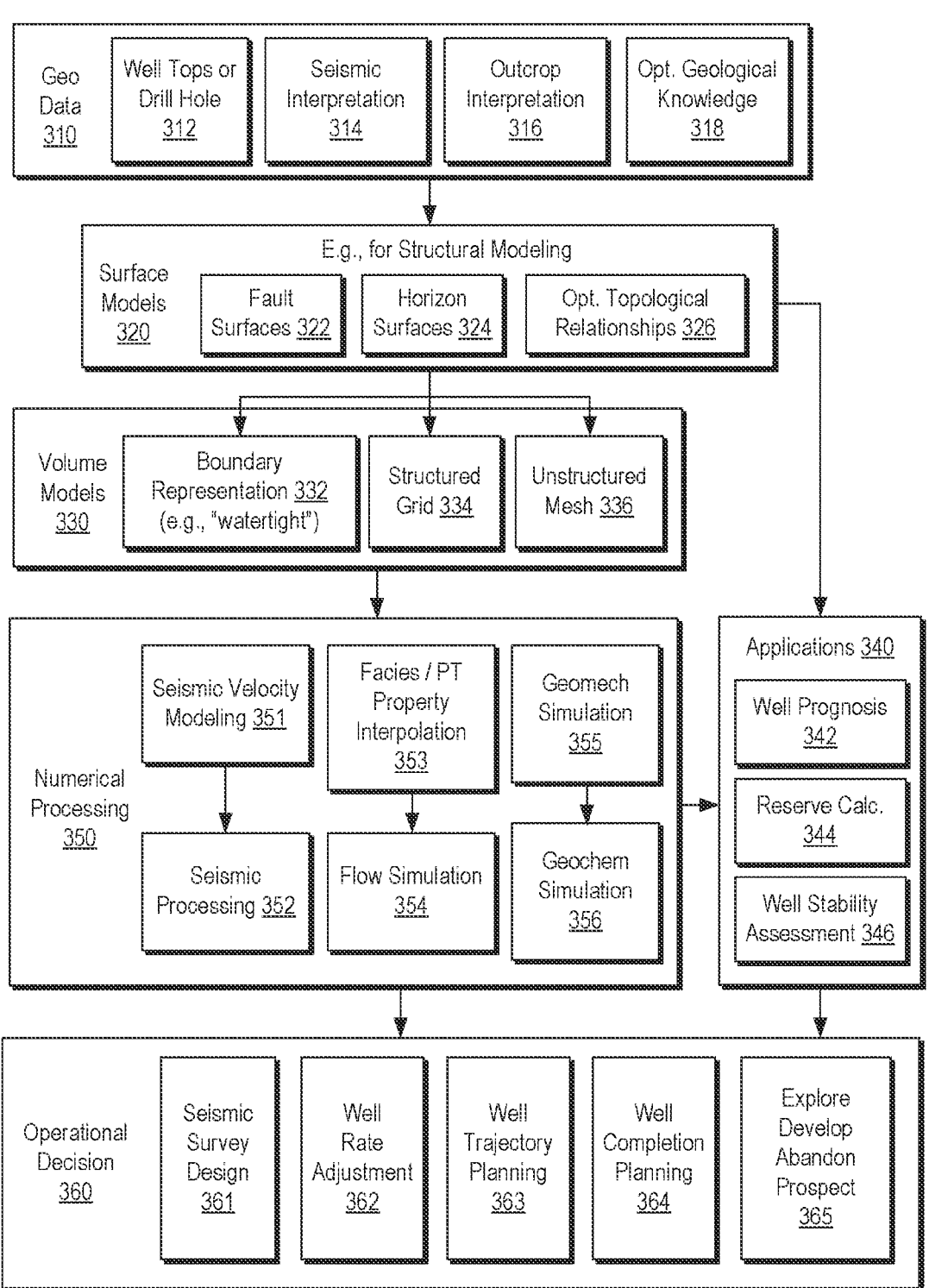
FIG. 3 illustrates an example of a system.

FIG. 3 shows an example of a system 300 that includes a geological/geophysical data block 310, a surface models block 320 (e.g., for one or more structural models), a volume modules block 330, an applications block 340, a numerical processing block 350 and an operational decision block 360. As shown in the example of FIG. 3, the geological/geophysical data block 310 can include data from well tops or drill holes 312, data from seismic interpretation 314, data from outcrop interpretation and optionally data from geological knowledge. As to the surface models block 320, it may provide for creation, editing, etc. of one or more surface models based on, for example, one or more of fault surfaces 322, horizon surfaces 324 and optionally topological relationships 326. As to the volume models block 330, it may provide for creation, editing, etc. of one or more volume models based on, for example, one or more of boundary representations 332 (e.g., to form a watertight model), structured grids 334 and unstructured meshes 336.

As shown in the example of FIG. 3, the system 300 may allow for implementing one or more workflows, for example, where data of the data block 310 are used to create, edit, etc. one or more surface models of the surface models block 320, which may be used to create, edit, etc. one or more volume models of the volume models block 330. As indicated in the example of FIG. 3, the surface models block 320 may provide one or more structural models, which may be input to the applications block 340. For example, such a structural model may be provided to one or more applications, optionally without performing one or more processes of the volume models block 330 (e.g., for purposes of numerical processing by the numerical processing block 350). Accordingly, the system 300 may be suitable for one or more workflows for structural modeling (e.g., optionally without performing numerical processing per the numerical processing block 350).

As to the applications block 340, it may include applications such as a well prognosis application 342, a reserve calculation application 344 and a well stability assessment application 346. As to the numerical processing block 350, it may include a process for seismic velocity modeling 351 followed by seismic processing 352, a process for facies and petrophysical property interpolation 353 followed by flow simulation 354, and a process for geomechanical simulation 355 followed by geochemical simulation 356. As indicated, as an example, a workflow may proceed from the volume models block 330 to the numerical processing block 350 and then to the applications block 340 and/or to the operational decision block 360. As another example, a workflow may proceed from the surface models block 320 to the applications block 340 and then to the operational decisions block 360 (e.g., consider an application that operates using a structural model).

In the example of FIG. 3, the operational decisions block 360 may include a seismic survey design process 361, a well rate adjustment process 362, a well trajectory planning process 363, a well completion planning process 364 and a process for one or more prospects, for example, to decide whether to explore, develop, abandon, etc. a prospect.

Referring again to the data block 310, the well tops or drill hole data 312 may include spatial localization, and optionally surface dip, of an interface between two geological formations or of a subsurface discontinuity such as a geological fault; the seismic interpretation data 314 may include a set of points, lines or surface patches interpreted from seismic reflection data, and representing interfaces between media (e.g., geological formations in which seismic wave velocity differs) or subsurface discontinuities; the outcrop interpretation data 316 may include a set of lines or points, optionally associated with measured dip, representing boundaries between geological formations or geological faults, as interpreted on the earth surface; and the geological knowledge data 318 may include, for example knowledge of the paleo-tectonic and sedimentary evolution of a region.

As to a structural model, it may be, for example, a set of gridded or meshed surfaces representing one or more interfaces between geological formations (e.g., horizon surfaces) or mechanical discontinuities (fault surfaces) in the subsurface. As an example, a structural model may include some information about one or more topological relationships between surfaces (e.g. fault A truncates fault B, fault B intersects fault C, etc.).

As to the one or more boundary representations 332, they may include a numerical representation in which a subsurface model is partitioned into various closed units representing geological layers and fault blocks where an individual unit may be defined by its boundary and, optionally, by a set of internal boundaries such as fault surfaces.

As to the one or more structured grids 334, it may include a grid that partitions a volume of interest into different elementary volumes (cells), for example, that may be indexed according to a pre-defined, repeating pattern. As to the one or more unstructured meshes 336, it may include a mesh that partitions a volume of interest into different elementary volumes, for example, that may not be readily indexed following a pre-defined, repeating pattern (e.g., consider a Cartesian cube with indexes I, J, and K, along x, y, and z axes).

As to the seismic velocity modeling 351, it may include calculation of velocity of propagation of seismic waves (e.g., where seismic velocity depends on type of seismic wave and on direction of propagation of the wave). As to the seismic processing 352, it may include a set of processes allowing identification of localization of seismic reflectors in space, physical characteristics of the rocks in between these reflectors, etc.

As to the facies and petrophysical property interpolation 353, it may include an assessment of type of rocks and of their petrophysical properties (e.g. porosity, permeability), for example, optionally in areas not sampled by well logs or coring. As an example, such an interpolation may be constrained by interpretations from log and core data, and by prior geological knowledge.

As to the flow simulation 354, as an example, it may include simulation of flow of hydro-carbons in the subsurface, for example, through geological times (e.g., in the context of petroleum systems modeling, when trying to predict the presence and quality of oil in an un-drilled formation) or during the exploitation of a hydrocarbon reservoir (e.g., when some fluids are pumped from or into the reservoir).

As to geomechanical simulation 355, it may include simulation of the deformation of rocks under boundary conditions. Such a simulation may be used, for example, to assess compaction of a reservoir (e.g., associated with its depletion, when hydrocarbons are pumped from the porous and deformable rock that composes the reservoir). As an example a geomechanical simulation may be used for a variety of purposes such as, for example, prediction of fracturing, reconstruction of the paleo-geometries of the reservoir as they were prior to tectonic deformations, etc.

As to geochemical simulation 356, such a simulation may simulate evolution of hydrocarbon formation and composition through geological history (e.g., to assess the likelihood of oil accumulation in a particular subterranean formation while exploring new prospects).

As to the various applications of the applications block 340, the well prognosis application 342 may include predicting type and characteristics of geological formations that may be encountered by a drill-bit, and location where such rocks may be encountered (e.g., before a well is drilled); the reserve calculations application 344 may include assessing total amount of hydrocarbons or ore material present in a subsurface environment (e.g., and estimates of which proportion can be recovered, given a set of economic and technical constraints); and the well stability assessment application 346 may include estimating risk that a well, already drilled or to-be-drilled, will collapse or be damaged due to underground stress.

As to the operational decision block 360, the seismic survey design process 361 may include deciding where to place seismic sources and receivers to optimize the coverage and quality of the collected seismic information while minimizing cost of acquisition; the well rate adjustment process 362 may include controlling injection and production well schedules and rates (e.g., to maximize recovery and production); the well trajectory planning process 363 may include designing a well trajectory to maximize potential recovery and production while minimizing drilling risks and costs; the well completion planning process 364 may include selecting proper well tubing, casing and completion (e.g., to meet expected production or injection targets in specified reservoir formations); and the prospect process 365 may include decision making, in an exploration context, to continue exploring, start producing or abandon prospects (e.g., based on an integrated assessment of technical and financial risks against expected benefits).

Figure 4:
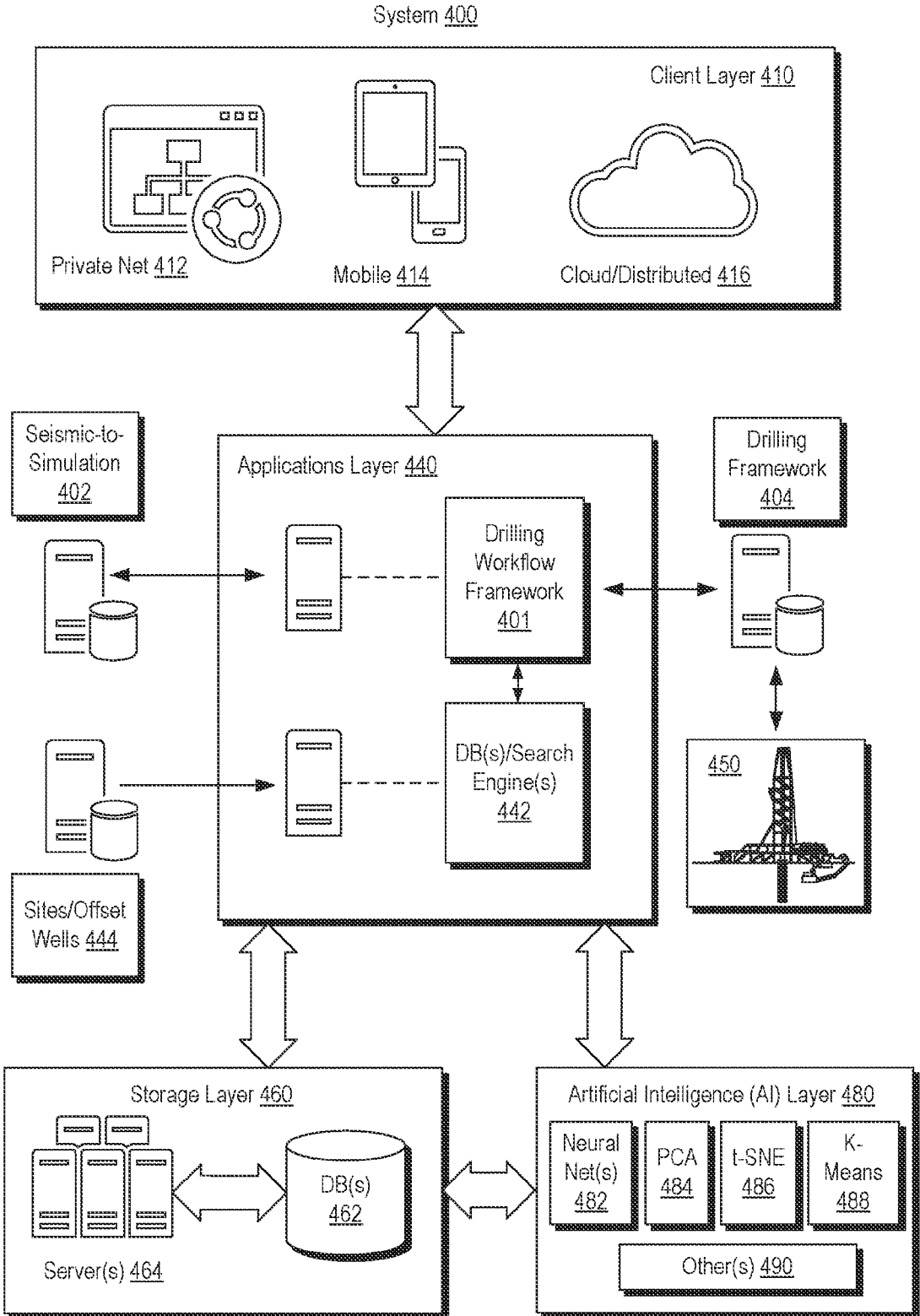
FIG. 4 illustrates an example of a system.

FIG. 4 shows an example of a system 400 that includes a drilling workflow framework 401, a seismic-to-simulation framework 402, a drilling framework 404, a client layer 410, an applications layer 440, a source or sources of site information that can include offset well information 444 (e.g., one or more databases, etc.), a storage layer 460 and an artificial intelligence (AI) layer 480. As shown the client layer 410 can be in communication with the applications layer 440 and the applications layer 440 can be in communication with the storage layer 460. As shown, the drilling framework 404 can interact with equipment 450, which can include one or more types of equipment such as, for example, rig equipment, wireline equipment, etc. As an example, seismic survey equipment, laboratory equipment, imagery equipment, etc., may be operatively coupled to one or more features of the system of FIG. 4.

In the example of FIG. 4, the AI layer 480 is shown as including various components, which can include, for example, one or more of a neural network(s) component 482, a principal component analysis (PCA) component 484, a t-distributed stochastic neighbor embedding (t-SNE) component 486, a K-means component 488 and one or more other components 490. As shown, the AI layer 480 may be operatively coupled to one or more other layers, such as, for example, the storage layer 460, the applications layer 440 and/or the client layer 410. As an example, the AI layer 480 may be implemented using one or more types of cloud-based resources, which may be accessible via the client layer 410, the applications layer 440, the storage layer 460 and/or one or more frameworks. As an example, the AI layer 480 may be operatively coupled to one or more features of the system 100 of FIG. 1. For example, consider the visualization feature 123 and/or the data access feature 125 as being operatively coupled to the AI layer 480, directly and/or indirectly. In such an example, a user may utilize the workspace solutions GUI 120 for one or more types of operations, which may include, for example, training and/or utilizing one or more machine learning models (ML models) of the AI layer 480. Such an approach may help a user locate particular data and/or allow one or more of the computational frameworks 121 locate particular data, for example, in an automated manner. As an example, output of the workspace solutions GUI 120 may be directed to the storage layer 460 and/or the AI layer 480.

As an example, the AI layer 480 may operate on data in the storage layer 460 where, for example, data may be organized and/or indexed according to one or more AI types of processes. For example, consider processing of data to group data where group data can be stored and/or indexed in the storage layer 460. Such grouped data may include one or more types of data groups, which may be content-based data groups. For example, consider one or more processes that can group data at least in part via supervised and/or unsupervised machine learning.

The oil and gas industry produces various types of content, which can include, for example, various types of reports pertaining to exploration, drilling, operations, etc. Some reports may date back decades, for example, to the 1930s. As an example, consider documents such as drilling reports, completion reports, logs (seismic, resistivity, impedance, etc.), biostratigraphy reports, lithology reports, etc. Such documents can include useful information such as, information in the form of text and/or images.

In the oil and gas industry, as much as 80 percent of the data exists in the form of unstructured documents, some of which are used by oil companies to analyze and gain insights for their workflows. As an example, the AI layer 480 may be implemented to perform one or more types of document analyses, which can include, for example, insight extraction from text and/or images. In such an example, the AI layer 480 may be implemented for image classification where it may aim to classify images contained in various unstructured documents. In such an example, image classification may be feature-based, where classification can be at least in part according to one or more features. With classified images, a user and/or a machine may be able to access, navigate and/or search such images, optionally using one or more types of interfaces, visualization GUIs, queries, etc. For example, consider a query that can be used to search documents/pages on basis of their classification tags. As another example, consider a GUI that can allow for dragging and dropping a search-by image and/or that can allow for browsing for image to select for an image-based search. As an example, a GUI may allow a user to draw a diagram in a window on a display directly and/or indirectly via a human input device (HID) (e.g., using a stylus, a finger, etc.). In such an example, a search may be initiated to utilize the diagram as a query for matching. As an example, a GUI may provide for rendering of a visualization, which may be a space that includes representations of data (e.g., documents, etc.). In such an example, a user may navigate the visualization (e.g., a network, clusters, etc.) to hone in on desirable content (e.g., data, etc.). As an example, classification can include grouping based on images with tabular information, which may have been identified and classified as tables. As an example, the system 400 may execute an automated workflow to feed images to a component or components designed for extraction of tabular information. For example, consider a trained machine learning model that can identify tables for extraction from scanned documents. As an example, one or more AI components of the AI layer 480 may be utilized in a hierarchical manner. For example, consider an approach that includes tiers of classifiers such that a first level may classify broad categories of disparate types of content (e.g., data, documents, etc.) and where a second level may be more specific and classify as to a narrower set of categories (e.g., classes).

As an example, the AI layer 480 may be utilized as an image classification layer, that can provide multi-staged self-supervised machine learning techniques and for integration with a visualization tool to transform image classification capabilities in a data ecosystem.

As mentioned, a supervised learning approach may be implemented to handle image classification. For example, consider AutoML Vision (Google, Mountain View, CA), which allows a user to label images and create a trained machine learning model. Such a supervised approach may encounter various limitations such as, for example: repetitive training of machine learning models; an extensive, suitable, unbiased training dataset of thousands of images of each category; manual labelling of each image in the training dataset; and hours of time to train the model. Another component, AutoML Vision Edge allows a user to export a trained model, for example, to deploy low-latency models optimized for edge devices (e.g., with TENSORFLOW Lite, Core ML, etc. export formats). AutoML Vision Edge includes hardware support for edge TPUs, ARM and NVIDIA hardware. As an example, iOS and/or ANDROID devices can use AutoML Vision Edge in ML Kit (e.g., available via FIREBASE for an end-to-end development flow for creating and deploying custom models to mobile devices using ML Kit client libraries).

As mentioned, an unsupervised learning approach may be implemented to handle image classification. For example, different users/clients of the DELFI environment can be interested in different classification categories, for example, creating a customized machine learning model for each client, specific to the client's own particulars, which can in a supervised learning approach be quite cumbersome, time-consuming and expensive. Where an unsupervised learning is implemented, a classification system can cater to different demands of different clients, for example, irrespective of the kinds of images the client may have in its dataset. As an example, a trained ML model that is trained via unsupervised learning may be deployed, for example, to an edge, a cloud, etc. As an example, a piece of equipment may be operatively coupled to a trained ML model such that its output can be processed for purposes of classification. For example, consider tagging information (e.g., data, imagery, etc.) that is output by equipment using an operatively coupled ML model (or models) and/or an embedded ML model (or models).

Referring again to the various components in the AI layer 480, for example, consider using Convolution Neural Networks (CNNs such as autoencoders, etc.) per the component 482, dimensionality reduction techniques (e.g., PCA, t-SNE, etc.) per the components 484 and 486, and a suitable clustering algorithm (e.g., K-means) per the component 484. In such an approach, the AI layer 480 can be implemented to segregate images contained in different documents (e.g., accessible or otherwise permissioned to a client, etc.) into clusters of images on a basis of similarity between features.

As explained, the AI layer 480 may be operatively coupled to and/or include a visualization tool (e.g., one or more GUIs, etc.) to allow a user to view clusters of similar images in a multidimensional space (e.g., 2D, 3D, etc.). In such an example, a tool may allow a user to add classification tags to an entire cluster at one go and/or to one or more of individual images. As an example, clusters visualized in a 3D space may allow a user to retrieve and compare similar images from different documents (e.g., clustered together in different degrees), thus providing freedom from restrained "within-document" comparisons.

Referring again to the system 400 of FIG. 4, the client layer 410 can include features that allow for access and interactions via one or more private networks 412, one or more mobile platforms and/or mobile networks 414 and via the "cloud" 416, which may be considered to include distributed equipment that forms a network such as a network of networks.

In the example of FIG. 4, the applications layer 440 includes the drilling workflow framework 401. The applications layer 440 also includes a database management component 442 that includes one or more search engines components. As an example, a planning framework may be included in the applications layer and/or one or more other types of frameworks. As an example, the system 400 of FIG. 4 can include one or more features of the DELFI environment. For example, consider the workspace framework 110 of FIG. 1 as being part of and/or accessible to the system 400 of FIG. 4.

As an example, the database management component 442 can include one or more search engine components that provide for searching one or more types of information that may be stored in one or more data repositories. As an example, the STUDIO E&P knowledge environment (Schlumberger Ltd., Houston, Texas) includes STUDIO FIND search functionality, which provides a search engine. The STUDIO FIND search functionality also provides for indexing content, for example, to create one or more indexes. As an example, search functionality may provide for access to public content, private content or both, which may exist in one or more databases, for example, optionally distributed and accessible via an intranet, the Internet or one or more other networks. As an example, a search engine may be configured to apply one or more filters from a set or sets of filters, for example, to enable users to filter out data that may not be of interest. As an example, the database management component 442 may be operatively coupled to the AI layer 480 and/or the storage layer 460 where one or more AI-based searches, operations, etc., may be performed. For example, the STUDIO E&P knowledge environment may be enhanced through one or more features of the AI layer 480.

As an example, a framework may provide for interaction with a search engine and, for example, associated features such as features of the STUDIO FIND search functionality. As an example, a framework may provide for implementation of one or more spatial filters (e.g., based on an area viewed on a display, static data, etc.). As an example, a search may provide access to dynamic data (e.g., "live" data from one or more sources), which may be available via one or more networks (e.g., wired, wireless, etc.). As an example, one or more components may optionally be implemented within a framework or, for example, in a manner operatively coupled to a framework (e.g., as an add-on, a plug-in, etc.). As an example, a component for structuring search results (e.g., in a list, a hierarchical tree structure, etc.) may optionally be implemented within a framework or, for example, in a manner operatively coupled to a framework (e.g., as an add-on, a plug-in, etc.).

In the example of FIG. 4, the applications layer 440 can include communicating with one or more resources such as, for example, the seismic-to-simulation framework 402, the drilling framework 404 and/or one or more sites, which may be or include one or more offset wellsites. As an example, the applications layer 440 may be implemented for a particular wellsite where information can be processed as part of a workflow for operations such as, for example, operations performed, being performed and/or to be performed at the particular wellsite. As an example, an operation may involve directional drilling, for example, via geosteering. As an example, one or more classified types of data via the AI layer 480 may be utilized in performing one or more types of field operations, which can include one or more drilling operations using the equipment 450 and/or other equipment. For example, consider directional drilling according to one or more types of classified images (e.g., as to logs, lithology, etc.).

In the example of FIG. 4, the storage layer 460 can include various types of data, information, etc., which may be stored in one or more databases 462. As an example, one or more servers 464 may provide for management, access, etc., to data, information, etc., stored in the one or more databases 462. As an example, the database management component 442 may provide for searching as to data, information, etc., stored in the one or more databases 462.

As an example, the database management component 442 may include features for indexing, etc. As an example, information may be indexed at least in part with respect to a wellsite. For example, where the applications layer 440 is implemented to perform one or more workflows associated with a particular wellsite, data, information, etc., associated with that particular wellsite may be indexed based at least in part on the wellsite being an index parameter (e.g., a search parameter). As an example, one or more images may be classified according to wellsite imagery and/or wellsite text. As an example, a GUI that can render clusters of different types of content may provide for re-clustering on one or more other bases. For example, consider re-clustering based on wellsite information. As an example, a GUI can include highlighting one or more clusters and/or one or more members of a cluster responsive to a search query. For example, consider a text and/or image based search query where results may be highlighted within a GUI of clusters. In such an example, one or more visualization techniques may be utilized to rank search results, for example, using a color spectrum, brightness, size, etc. For example, very relevant documents in one or more clusters may be highlighted in green while non-relevant documents (e.g., below a threshold level of similarity, etc.) may be rendered in red (e.g., or not rendered). As an example, a GUI may allow for rendering indications of relevant and non-relevant documents, data, etc., such that "what is not relevant" may be visualized and informative to a user or users.

As an example, the system 400 of FIG. 4 may be implemented to perform one or more portions of one or more workflows associated with equipment and/or processes such as those of FIG. 1, 2 or 3. As an example, the drilling workflow framework 401 may interact with a technical data framework and the drilling framework 404 before, during and/or after performance of one or more drilling operations. In such an example, the one or more drilling operations may be performed in a geologic environment (see, e.g., the environment 150 of FIG. 1, the sedimentary basin 210 of FIG. 2, etc.) using one or more types of equipment.

As to the system 300 of FIG. 3, consider utilization of the AI layer 480 for the geo data block 310 (e.g., for well tops, seismic interpretations, outcrop interpretations, etc.), the surface models block 320 (e.g., for structural modeling using information in one or more classified images, etc.), for the volume models block 330 (e.g., for gridding, meshing, etc.), for the applications block 340 (e.g., for initializing, for comparing results, etc.), for the numerical processing block 350 (e.g., for populating parameters from tables, for comparing simulation results, etc.), for the operational decision block 360 (e.g., designing, adjusting, planning, etc., using one or more types of classified data, etc.).

As an example, an architecture utilized in a system such as, for example, the system 400 may include features of the AZURE architecture (Microsoft Corporation, Redmond, WA). As an example, a cloud portal block can include one or more features of an AZURE portal that can manage, mediate, etc. access to one or more services, data, connections, networks, devices, etc. As an example, the system 400 may include features of the GOOGLE cloud architecture (Google, Mountain View, CA). As an example, a system may utilize one or more application programming interfaces associated with a cloud platform (e.g., GOOGLE cloud APIs, etc.).

As an example, the system 400 can include a cloud computing platform and infrastructure, for example, for building, deploying, and managing applications and services (e.g., through a network of datacenters, etc.). As an example, such a cloud platform may provide PaaS and IaaS services and support one or more different programming languages, tools and frameworks, etc.

Figure 5:
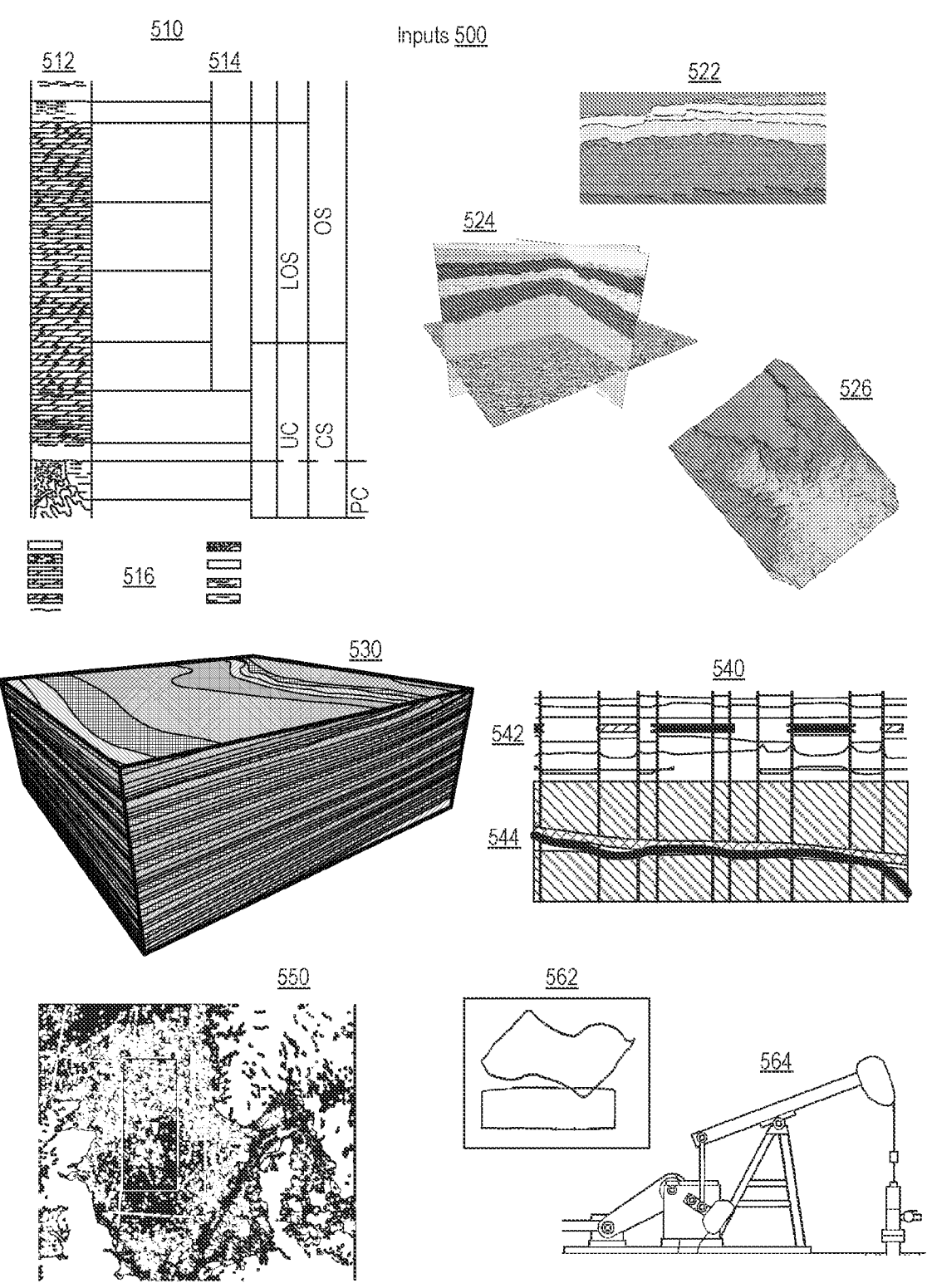
FIG. 5 illustrates some examples of inputs.

FIG. 5 shows various types of inputs 500, which can include, for example, lithographic charts 510 that can include graphics 512, text 514 and legends 516; seismic sections 522, 524 and 526; volumetric models 530 (e.g., grids, meshes, etc., of a reservoir, a basin, etc.); logs 540 that can include data and images 542 and graphics of borehole trajectories with respect to layers of material 544; satellite imagery 550 that can include ship traffic, offshore rigs, and wind farms; plots 562 that may be associated with images and/or graphics of equipment 564; etc.

As shown in FIG. 5, the inputs 500 can be varied and may be received in one or more formats. As an example, such inputs 500 can include document based inputs. For example, consider one or more of the inputs 500 as being on a sheet of paper that can be scanned, photographed, etc., such that the content is digitized (e.g., represented as pixels, etc.). As an example, a pixel image may be in black and white, grayscale, color, etc. As an example, a pixel image may include data in an array where numbers represent black or white, a level of grayscale, etc. As an example, a color image may include multiple values per pixel. As an example, one or more color schemes may be utilized (e.g., RGB, CMYK, YIQ, YPbPr, xvYXX, HSV, HSL, etc.).

As an example, content may be associated with metadata. For example, consider an application type, a computer type, an IP address, a format, a geolocation, a time, etc. As an example, metadata may be associated with a classified document, file, etc. For example, consider a process that can cluster using content where searching may be performed using metadata and/or content.

As mentioned, a system may include features for using a reference image, which may be a reference document. For example, consider a user that may photograph or otherwise scan a reference document and then perform a search using content of the reference document. In such an example, the reference document may include mixed types of content such that search results may exist in different types of clusters or, for example, in a cluster that represents data with such mixed types of content.

Figure 6:
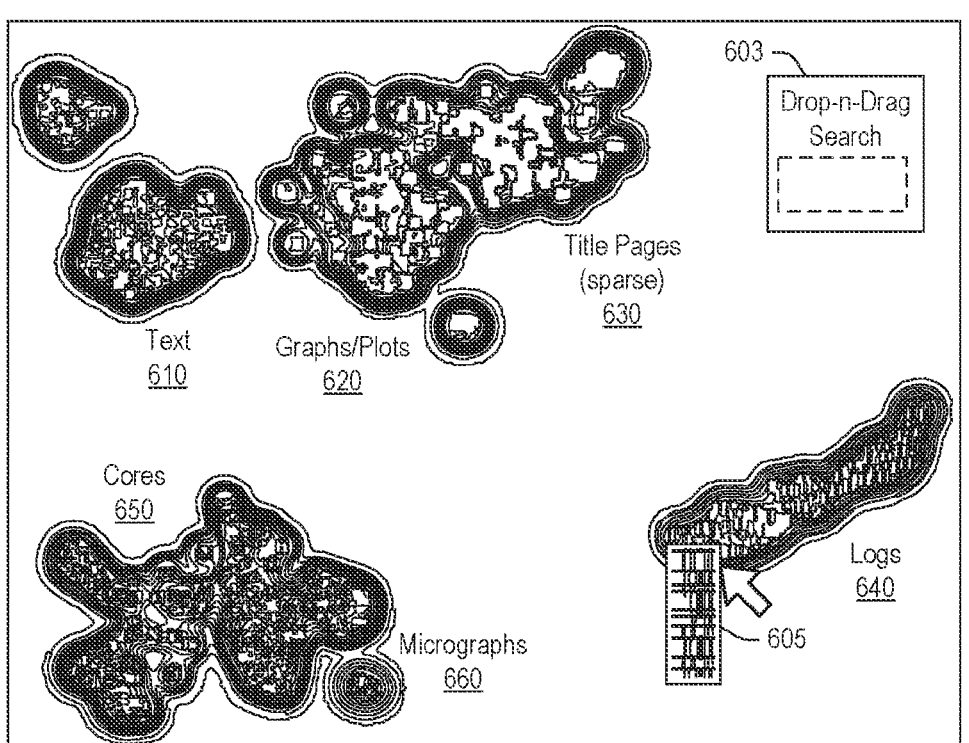
FIG. 6 illustrates some examples of output spaces.
Figure 6:
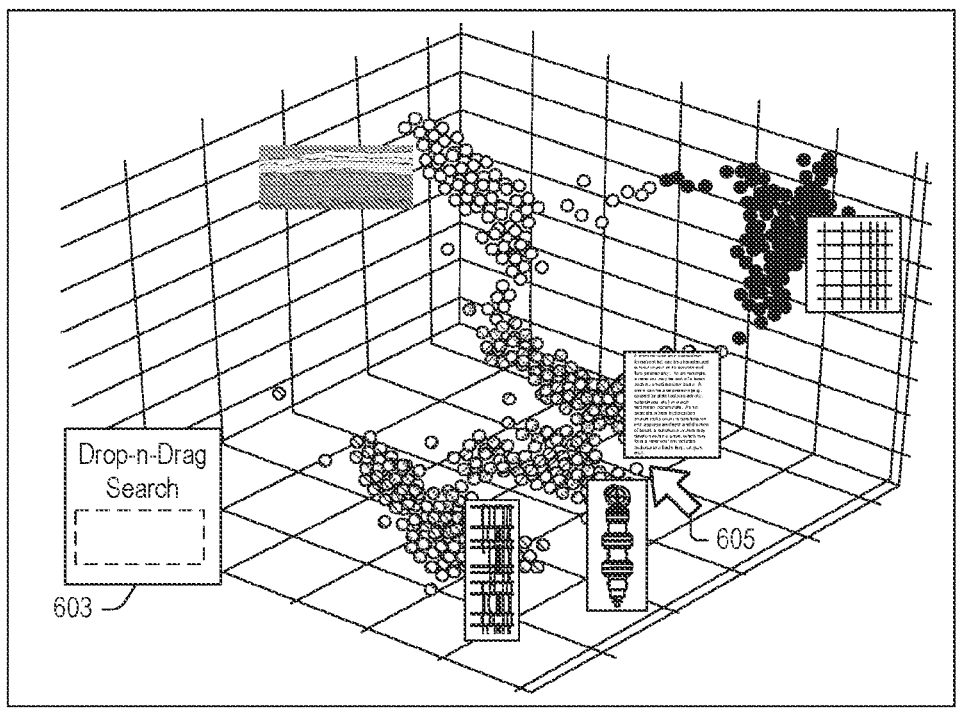

FIG. 6 shows some examples of output spaces 602 and 604 that may be rendered to a display as a type of GUI. As shown, a GUI can include one or more graphical controls 603 and 605 where, for example, the graphical control 603 may be a drag-n-drop search control (e.g., or file browser search control, etc.) and the graphical control 605 may allow for click and render such that a user can inspect content more carefully. As an example, controls may be interoperable, for example, click, render, drag-n-drop and then search where search results may be highlighted using one or more types of rendering techniques (e.g., color, hiding non-relevant results, etc.).

In the example output space 602 of FIG. 6, various clusters are indicated including a text cluster 610, a graphs/ plots cluster 620, a title pages cluster 630 (e.g., based on sparsity of content, etc.), a logs cluster 640, a cores cluster 650 and a micrographs cluster 660. In the example output space 604, various clusters are rendered in a 3D space along with icons (e.g., graphics, images, etc.) to facilitate identi-fication of content of each of the different clusters.

In each of the clusters of the output space 602 and/or the output space 604, graphics may represent data, which may be documents. In such an example, a user may click or hover on a graphic to cause a system to render the data (e.g., content, document, etc.) to a display. As an example, a menu and/or other feature may be available to select a graphic and to utilize the underlying data for purposes of a search (see, e.g., the graphical controls 603 and 605, etc.). As an example, a system may include one or more zoom features to zoom into and/or out of search results, which may be within a single one of the clusters in the output space 602 and/or 604. As mentioned, where metadata and/or other tags exist, a search may be performed using such metadata and/or tag(s) to identify matching results amongst the graphics presented in the output space 602 and/or 604. For example, consider the graphical control 603 as being capable of toggling for one or more types of search techniques (e.g., image, content, text, etc.). As explained, results may be highlighted in one or more manners to allow a user to understand better the results and/or select one or more of the results.

Figure 7:
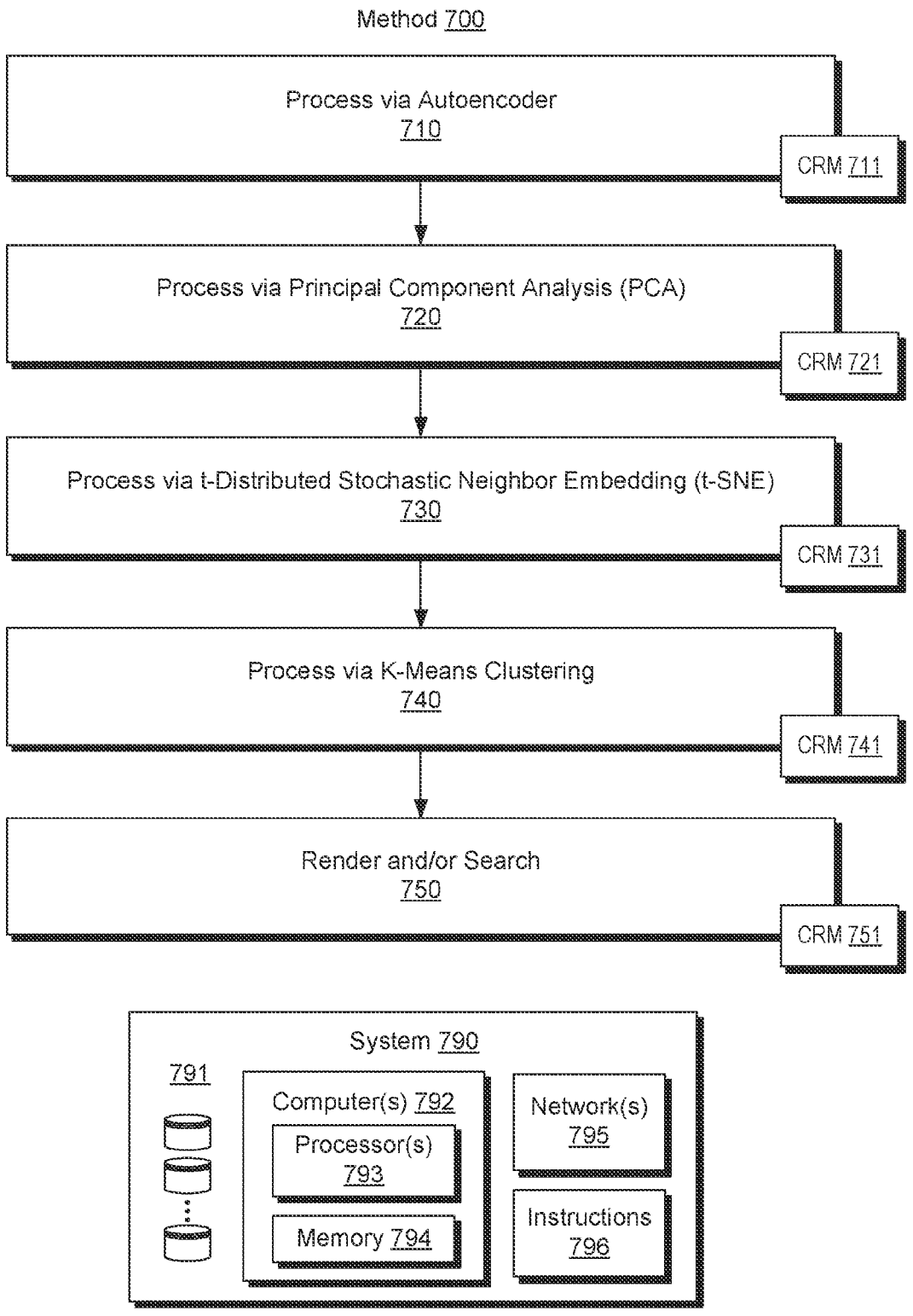
FIG. 7 illustrates an example of a method and an example of a system.

FIG. 7 shows an example of a method 700 that includes a process block 710 for processing data using an autoen-coder to generate autoencoder output, a process block 720 for processing autoencoder output using principal compo-nent analysis (PCA) to generate PCA output, a process block 730 for processing the PCA output using t-distributed sto-chastic neighbor embedding (t-SNE) to generate t-SNE output, a process block 740 for processing t-SNE output using k-means clustering to generate clusters, and a render and/or search block 750 for rendering and/or searching one or more of the generated clusters.

The method 700 is shown in FIG. 7 in association with various computer-readable media (CRM) blocks 711, 721, 731, 741 and 751. Such blocks generally include instructions suitable for execution by one or more processors (or pro-cessor cores) to instruct a computing device or system to perform one or more actions. While various blocks are shown, a single medium may be configured with instructions to allow for, at least in part, performance of various actions of the method 700. As an example, a computer-readable medium (CRM) may be a computer-readable storage medium that is non-transitory and that is not a carrier wave. As an example, one or more of the blocks 711, 721, 731, 741 and 751 may be in the form processor-executable instruc-tions, for example, consider the one or more sets of instruc-tions 270 of the system 250 of FIG. 2, etc.

In the example of FIG. 7, the system 790 includes one or more information storage devices 791, one or more com-puters 792, one or more networks 795 and instructions 796. As to the one or more computers 792, each computer may include one or more processors (e.g., or processing cores) 793 and memory 794 for storing the instructions 796, for example, executable by at least one of the one or more processors 793 (see, e.g., the blocks 711, 721, 731, 741 and 751). As an example, a computer may include one or more network interfaces (e.g., wired or wireless), one or more graphics cards, a display interface (e.g., wired or wireless), etc.

Figure 8:
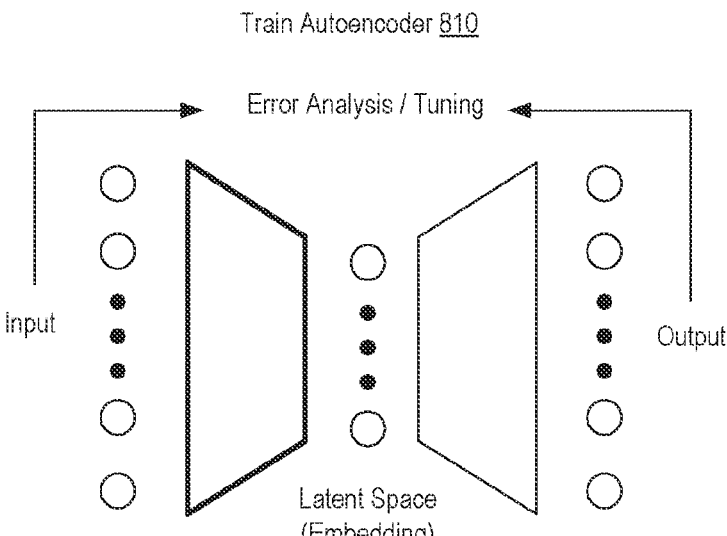
FIG. 8 illustrates examples of processes.
Figure 8:
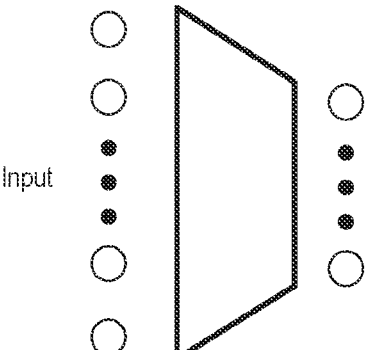

FIG. 8 shows an example of a process 810 for training an autoencoder and an example of a process 820 for space reduction. An autoencoder is a type of artificial neural network that can be used to learn efficient data codings in an unsupervised manner. For example, an aim of an autoen-coder can be to learn a representation (encoding) for a set of data, for example, for dimensionality reduction, which can involve training the network to ignore signal "noise". Along with the reduction side, a reconstructing side is learnt, where the autoencoder tries to generate, from the reduced encod-ing, a representation as close as possible to its original input.

Example variants of autoencoders may aim to force learned representations to assume useful properties. For example, consider regularized autoencoders (sparse, denois-ing and contractive), which are effective in learning repre-sentations for subsequent classification tasks, and variational autoencoders, with applications as generative models. As an example, an autoencoder may be utilized to in one or more types of recognitions task (e.g., images, text, etc.).

As example, an autoencoder can be neural network-based, where such an approach can provide for embeddings to be learned from a database in lower dimensions (e.g., a reduced dimensional space). As an example, embeddings can be representations in a reduced dimensional space (e.g., a latent space).

While an autoencoder is mentioned, one or more other types of models may be utilized such as, for example, one or more of variational autoencoders, generative adversarial neural networks, etc., which can be suitable to learn repre-sentations from a database into respective embeddings. Such embeddings can be used for one or more purposes such as, for example, one or more processes as explained with respect to the method 700 of FIG. 7.

As shown in FIG. 8, the training process 810 can reduce dimensionality of input to a smaller dimensionality in a latent space or an embedding. As shown, the illustrated autoencoder includes an encoder block and a decoder block. Such blocks may be referred to as a compressor and a decompressor. When both are trained, the output of the decompressor suitably matches the input to the compressor. In such an example, a trained decompressor (e.g., decoder) can take latent space representations and recreate a representation of its corresponding original input.

In various instances, dimensionality reduction can be beneficially utilized for classifying. For example, a compressed representation of an image may help reduce resource demands for searching, etc. As an example, a compressed or latent space representation of an image can retain image characteristics such that it can be compared to other compressed or latent space representations of other images. In an autoencoder, the decoder (e.g., decompressor) inherently helps to assure that a compressed representation does include adequate characteristics of original input such that reproduction is possible via inputting the compressed representation into the trained decoder (e.g., trained decompressor).

Once an encoder is trained to generate a trained encoder, the trained encoder may be utilized to generate meaningful representations of original inputs in a lesser dimensional space. In such an example, a link or other association can be maintained between the compressed representation and the original input such that a graphic indicative of a result based on the compressed representation can be readily used to present the original input. For example, consider a scanned document with logs from a wireline survey of a portion of a borehole. In such an example, the document may be processed by a trained encoder to generate a compressed representation of the document. As explained with respect to the method 700 of FIG. 7, the compressed representation may be utilized to facilitate clustering where a GUI may render a graphic representing the document via the compressed representation. In such an example, a user may select the graphic to cause a system to access the document as the document is linked or otherwise associated with its compressed representation (e.g., the graphic of the GUI).

As explained, training of an autoencoder may be performed in an unsupervised manner. With reference to the system 400 of FIG. 4, the AI layer 480 may operate on data in the storage layer 460 to automatically generate compressed representations of such data, which may be on a document-by-document or other basis. For example, consider documents scanned to PDF types of files, JPEG types of files, bitmap types of files, etc. In such an example, the AI layer 480 may access such files to generate compressed representations that are suitable for further processing, which may aim to facilitate searching, navigating, etc. In such an example, where new data enters the storage layer 460, a call may be issued to the AI layer 480 such that the new data (e.g., new documents, etc.) are processed.

As an example, consider a trial where images belonging to six classification categories are utilized as being relevant to the oil and gas industry. Documents within such categories can be found in archives as unstructured documents and reports. For example, consider categories as images of well logs ("logs", cores, microscopic rocks and minerals ("rock"), passages of text ("passages"), plots and graphs, and title pages ("blank"), as they tend to be sparse. In such a trial, consider a dataset of approximately 250 to approximately 300 images in each of the categories (e.g., a total of approximately 1500 to approximately 1800 documents). In such an example, labeling can be performed, for example, to demonstrate validity of results.

As explained with respect to FIG. 7, a method can involves integrating multiple ML algorithms in a manner that sequentially reduces the dimensions of the input images (e.g., represented by high dimensional vectors and/or arrays) to generate two or three dimensional vectors for each image that can be more readily visualized. In such a method, dimensionality reduction can aim to reduce the dimensions in a manner such that final low dimension vectors (e.g., 2D, 3D or 4D, etc.) of similar images lay relatively close to each other. In such a manner, clusters of similar images in a low dimensional space can be generated based on the similarity of features between images. As an example, a low dimensional space can be a space with a number of dimensions that allows for visualization via rendering to a 2D display and/or a 3D display (e.g., using holography, stereography, etc.). As an example, one or more additional dimensions may be introduced, with appropriate handling for visualization (see, e.g., plotmatrix function, slice function, complex function, etc., of the MATLAB, MathWorks framework, Visualizing Four-Dimensional Data, R2020b), which may involve rendering multiple plots, etc.

As explained with respect to the method 700 of FIG. 7, an approach can include a sequence of processes such as, for example, an autoencoder process, a PCA process, a t-SNE process, and a k-means clustering process.

As explained, a collection of images (e.g., represented by high dimensional vectors or arrays) can be fed to a suitably designed autoencoder. In such an example, a trained encoder of the autoencoder can generate a compressed representation of each of the original inputs in a manner that using this compressed representation itself, through use of a decoder of the autoencoder, an acceptable approximation of the original input can be reconstructed.

As explained, an encoder can be a part of a neural network that compresses input into a latent-space representation where the output from a bottleneck layer, which is the last layer of the encoder network, is the compressed representation that suitably contains relevant information to reconstruct the input image. As explained, a decoder is the part that aims to reconstruct the input image using the compressed representation generated from the bottleneck layer.

An autoencoder can be suitably designed to minimize the loss between the output and input images when trained using an input dataset. Such an approach helps to ensures that the compressed vectors received from the encoder accurately represent the features contained in an images dataset.

As set forth in the method 700 of FIG. 7, compressed representations output by an encoder, which can be vectors, can be fed to a PCA component for further dimensionality reduction.

Figure 9:
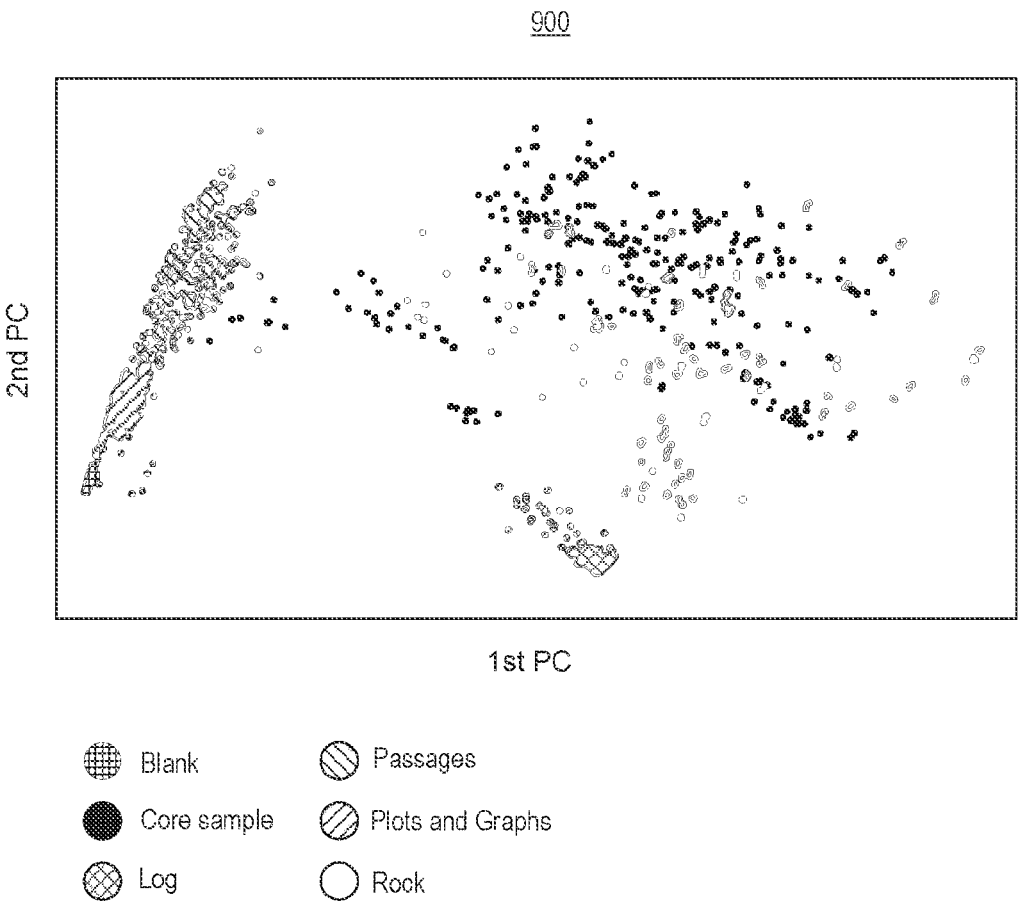
FIG. 9 illustrates an example of a graphical user interface.

FIG. 9 shows an example of a graphical user interface (GUI) 900 that includes graphics representing compressed representations of documents as compressed using a trained encoder (see, e.g., FIG. 8). Specifically, the GUI 900 shows output of a PCA process where a first principal component (1st PC) is plotted against a second principal component (2nd PC). In the example of FIG. 9, the GUI 900 shows blank document graphics, core sample document graphics, log document graphics, passages document graphics, plots and graphs document graphics (e.g., other than logs), and rock document graphics. As illustrated, PCA can spatially distribute the compressed representations of the documents, which include various types of content.

PCA is defined as an orthogonal linear transformation that transforms the data to a new coordinate system such that the greatest variance by some scalar projection of the data comes to lie on the first coordinate (e.g., the first principal component), the second greatest variance on the second coordinate (e.g., the second principal component), and so on. The principal components transformation can also be associated with another matrix factorization, the singular value decomposition (SVD). Dimensionality does involve some reduction in information, in general. PCA-based dimensionality reduction tends to minimize information loss, under certain signal and noise models. As an example, PCA may be performed using a covariance method and/or a correlation method.

The principal components of a collection of points in a real p-space are a sequence of p direction vectors, where the i-th vector is the direction of a line that best fits the data while being orthogonal to the first i−1 vectors. In such an example, a best-fitting line can be defined as one that minimizes the average squared distance from the points to the line. Such directions constitute an orthonormal basis in which different individual dimensions of the data can be linearly uncorrelated. PCA can be defined as a process of computing the principal components and using them to perform a change of basis on the data, sometimes using a few of the principal components (e.g., the first two, three, etc.).

PCA can be utilized for dimensionality reduction by projecting each data point onto the first few principal components to obtain lower-dimensional data while preserving as much of the data's variation as possible. The first principal component may be defined as a direction that maximizes the variance of the projected data. The i-th principal component can be taken as a direction orthogonal to the first i−1 principal components that maximizes the variance of the projected data.

PCA can be thought of as fitting a p-dimensional ellipsoid to the data, where each axis of the ellipsoid represents a principal component. If some axis of the ellipsoid is small, then the variance along that axis is also small. For example, consider the axis being small enough (e.g., less than a limit, etc.) such that it can be ignored. In such an ellipsoid description, to find the axes of the ellipsoid, a process can first subtract the mean of each variable from a dataset to center the data around the origin. Next, the process can compute the covariance matrix of the data and calculate the eigenvalues and corresponding eigenvectors of this covariance matrix. Next, the process can normalize each of the orthogonal eigenvectors to turn them into unit vectors where, once this is performed, each of the mutually orthogonal, unit eigenvectors can be interpreted as an axis of the ellipsoid fitted to the data. Such a choice of basis can transform a covariance matrix into a diagonalized form with the diagonal elements representing the variance of each axis. The proportion of the variance that each eigenvector represents can be calculated by dividing the eigenvalue corresponding to that eigenvector by the sum of all eigenvalues.

PCA can be an unsupervised linear transformation technique for feature extraction and dimensionality reduction. PCA can help to identify patterns in data based on correlations between features. As explained, PCA can aim to find the directions of maximum variance in high-dimensional data and project it onto a new subspace.

As an example, output vectors from an encoder can be flattened and fed as input to a PCA component. Such an approach can be set to a desired number of principal components. For example, consider identifying 50 principal components of maximum variance in a dataset. In such an example, a trial that utilized the first 50 principal components cumulatively described around 86 percent of the variance. Again, the GUI 900 shows a visualization of the first two principal components (along x-axis and y-axis) for each image in the dataset, represented in different fills according to true labels of the images.

In the GUI 900, one may infer that although the process is relatively successful in grouping similar images (e.g., having same labels) together, some amount of amount of overlapping between the groups exists such that, in some instances, clear demarcation is lacking.

As explained with respect to the method 700 of FIG. 7, to increase distinctions between categories, another process may be implemented using a t-SNE component, which can further reduce dimensionality.

Figure 10:
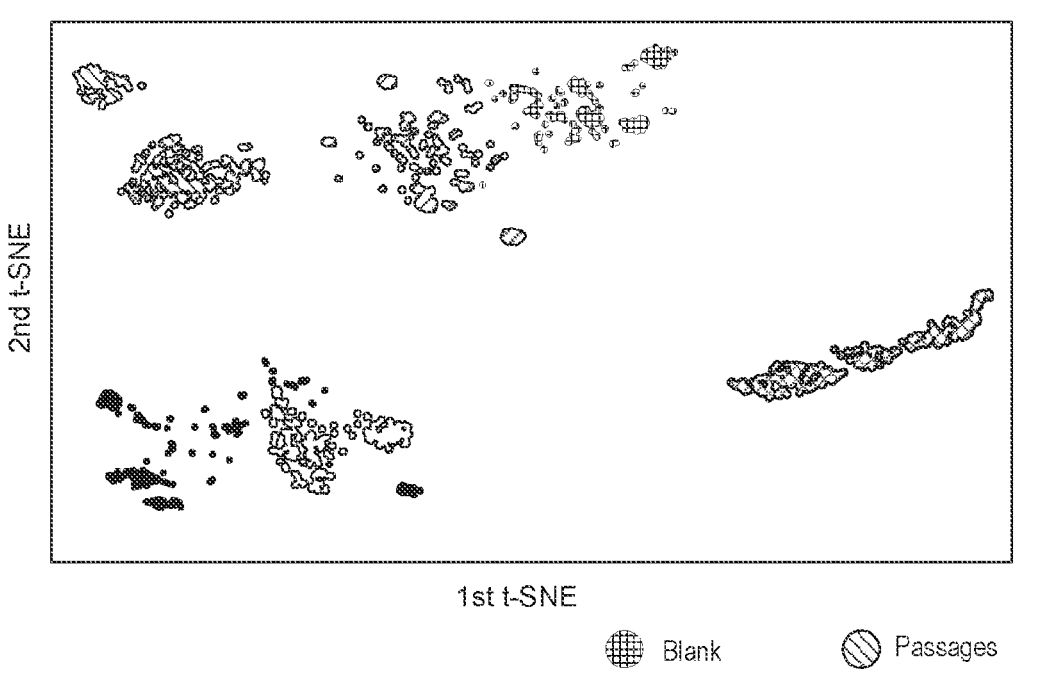
FIG. 10 illustrates examples of graphical user interfaces.
Figure 10:
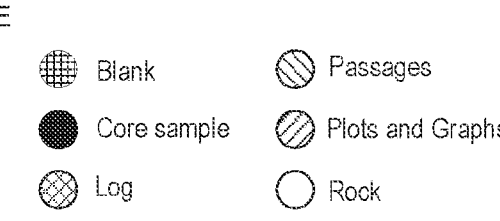
Figure 10:
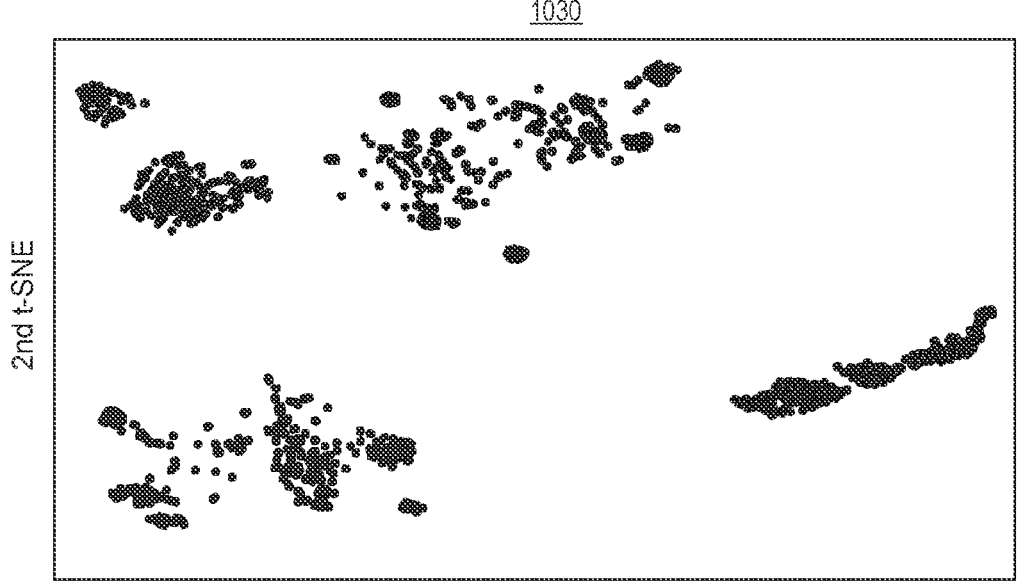

FIG. 10 shows example GUIs 1010 and 1030 where the GUIs 1010 are coded with respect to the documents as described in the GUI 900 of FIG. 9. In the example GUIs 1010 and 1030, the data are represented via a t-SNE process.

While some techniques for PCA may include nonlinear approaches, t-SNE is a nonlinear unsupervised transformation technique. As explained, t-SNE may be utilized for visualization of high dimensional datasets in a low dimensional space (e.g., 2D, 3D, 4D, etc.). The t-SNE approach can minimize the divergence between two distributions: a distribution that measures pairwise similarities of input objects and a distribution that measures pairwise similarities of corresponding low-dimensional points in an embedding. The end result is that, by suitably adjusting the hyperparameters of a t-SNE component, a reduction in the amount of overlapping between groups of similar images can be achieved.

As explained, the GUI 1010 shows a plot of 2D image vectors obtained as an output of a t-SNE component, visualizing the data points using their true labels. Looking at the GUI 1010, the t-SNE generated visualization of labelled images allows for an inference that such an approach is quite successful in reducing high dimensional image vectors to 2D vectors such that similar images are grouped together.

As explained, labels can be utilized as a mechanism to demonstrate performance; whereas, an unsupervised workflow may proceed with labeling. For example, consider the visualization in the GUI 1030 where labels are not present. Such a visualization may be a result of an unsupervised process where labeling is not performed. In the GUI 1030, without labels, while groups may be identified, an additional process may be performed, such as, for example, clustering (e.g., k-means clustering, etc.). In such an example, a clustering component may be implemented that can identify clusters of similar images automatically so that an entire group of similar images can be labelled at once (e.g., labeling after clustering, etc.). In such an example, clustering can assign each data point in the example 2D space of the GUI 1030 to a specific cluster using one or more suitable clustering techniques.

Figure 11:
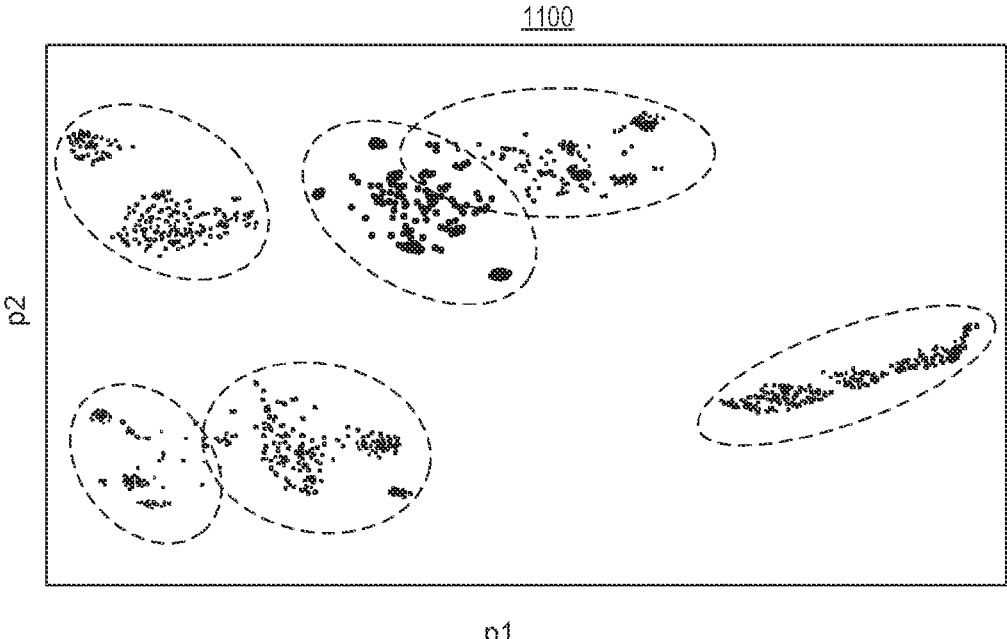
FIG. 11 illustrates an example of a graphical user interface.

FIG. 11 shows an example GUI 1100 in a two dimensional parameter space of a k-means clustering approach. In the example of FIG. 7, note that PCA is performed prior to clustering. It has been asserted that the relaxed solution of k-means clustering, specified by the cluster indicators, is given by the principal components, and the PCA subspace spanned by the principal directions is quite similar to the cluster centroid subspace (e.g., PCA is a relaxation of k-means clustering); further noting that counterexamples exist to the statement that the cluster centroid subspace is spanned by the principal directions.

In generating the visualization of the GUI 1100, k-means clustering is applied in an unsupervised machine learning approach that can categorize the data points into 'k' groups of similarity. To calculate that similarity, a trial utilized Euclidean distance as measurement; noting that one or more other defined distances may be utilized. The k-means process identifies k number of centroids, and then allocates each data point to its nearest cluster, while keeping the centroids as small as possible.

As the trial commenced with images belonging to 6 classes, taking the value of k=6 can be an acceptable starting assumption. However, where the number of classes is not known a priori, an optimal value of k may be determined using a technique such as the elbow technique. The elbow technique may be implemented using one or more frameworks (e.g., consider the scikit-learn framework) where the KElbowVisualizer implements the elbow technique to help find an optimal number of clusters by fitting a model with a range of values for k. In such an approach, if a line chart resembles an arm, then the elbow (the point of inflection on the curve) can be an acceptable indication that the underlying model fits best at that point.

Again, the GUI 1100 represent output of taking the value of k=6, running the t-SNE output vectors through k-means clustering to determine the cluster to which each data point belongs.

As an example, the GUI 1100 can include an interactive visualization tool with functionality to view images in a cluster, and accordingly add classification tags to the entire cluster as a whole or to the individual images. For example, consider the output space 602 and/or 604 of FIG. 6 as being generated using the GUI 1100 and a tool for labeling. In such an example, the labeling can be relatively straightforward.

Figure 12:
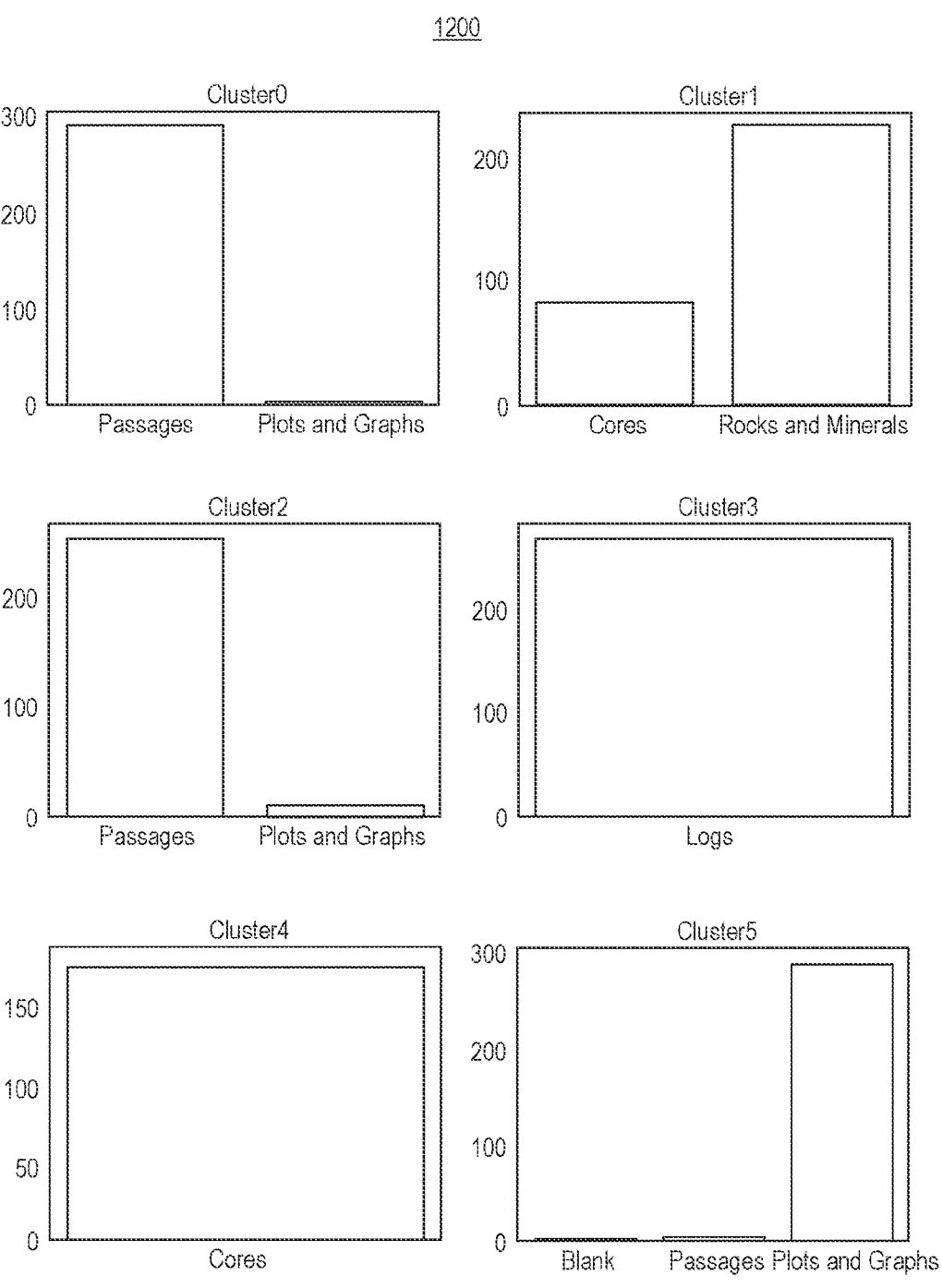
FIG. 12 illustrates examples of plots.

FIG. 12 shows examples of plots 1200 that correspond to the aforementioned trial where each of the plots 1200 corresponds to one of the six clusters: cluster0, cluster1, cluster2, cluster3, cluster4 and cluster5.

Specifically, the plots 1200 show histograms for each cluster describing its composition based on the true labels of the images belonging to the particular cluster. As shown, five of the clusters are completely dominated by a single image type, with very few images being clustered incorrectly. In cluster 1, around 80 core images have been inappropriately classified as rocks and minerals, in part because few images of these two classes have very similar features. As an example, a method can include additional tuning of machine learning hyperparameters used in a classification system, for example, making an autoencoder neural network computationally more powerful to identify relatively small details in an image. One or more approaches may be taken to address class members and to tailor one or more processes, for example, as set forth in the method 700 of FIG. 7.

As an example, a visualization tool can provide for interactions such that a user may visualize clusters with image thumbnails, accordingly add classification tags to an entire cluster, automatically retrieve and view similar images for comparison, and/or rapidly summarize page content distribution in a dataset.

As an example, as explained with respect to the system 400 of FIG. 4 and the system 100 of FIG. 1, an AI layer may be integrated with a DELFI environment data ecosystem ingestion workflow. For example, consider a workflow that can perform one or more types of optical character recognition (OCR) workflows. As an example, once a user has labelled different clusters of images, a classification system can have identified different classification categories that the particular user is interested in and, for example, also features of images belonging to each category. In such an example, images present in new data ingested by a system may be automatically classified into one of the existing clusters whose images have similar features as the new data.

As to an OCR feature, where text is identifiable in a document, an image, etc., an OCR feature may be implemented for character recognition where characters, words, phrase, etc., may be extracted. In such an example, such content may be associated with one or more other types of content. For example, consider metadata, a cluster label, etc. In such an example, a search that is at least in part text-based may be utilized to generate search results, for example, via relevance as to text in metadata, extracted text, cluster label text, etc. As an example, an OCR feature may operate on one or more types of content such as, for example, equipment drawings, images, plots, etc.

As an example, a system can include a search-and-cluster feature that may be implemented, for example, for enabling secondary levels of classification. For example, consider searching for selected pages that have been previously classified into a specific category and then carrying out clustering on them to enable secondary levels of classification. For example, by running a set of processes on pages that have been classified as logs already, a system may determine the kinds of logs present in the data (e.g., acoustic logs, gamma-ray logs, etc.).

As an example, a system may include one or more deduplication features, for example, to identify a duplicate and to ignore and/or otherwise handle the duplicate. As an example, a system may perform in a more robust manner as to segregating content where duplicates are removed in a pre-processing operation.

Figure 13:
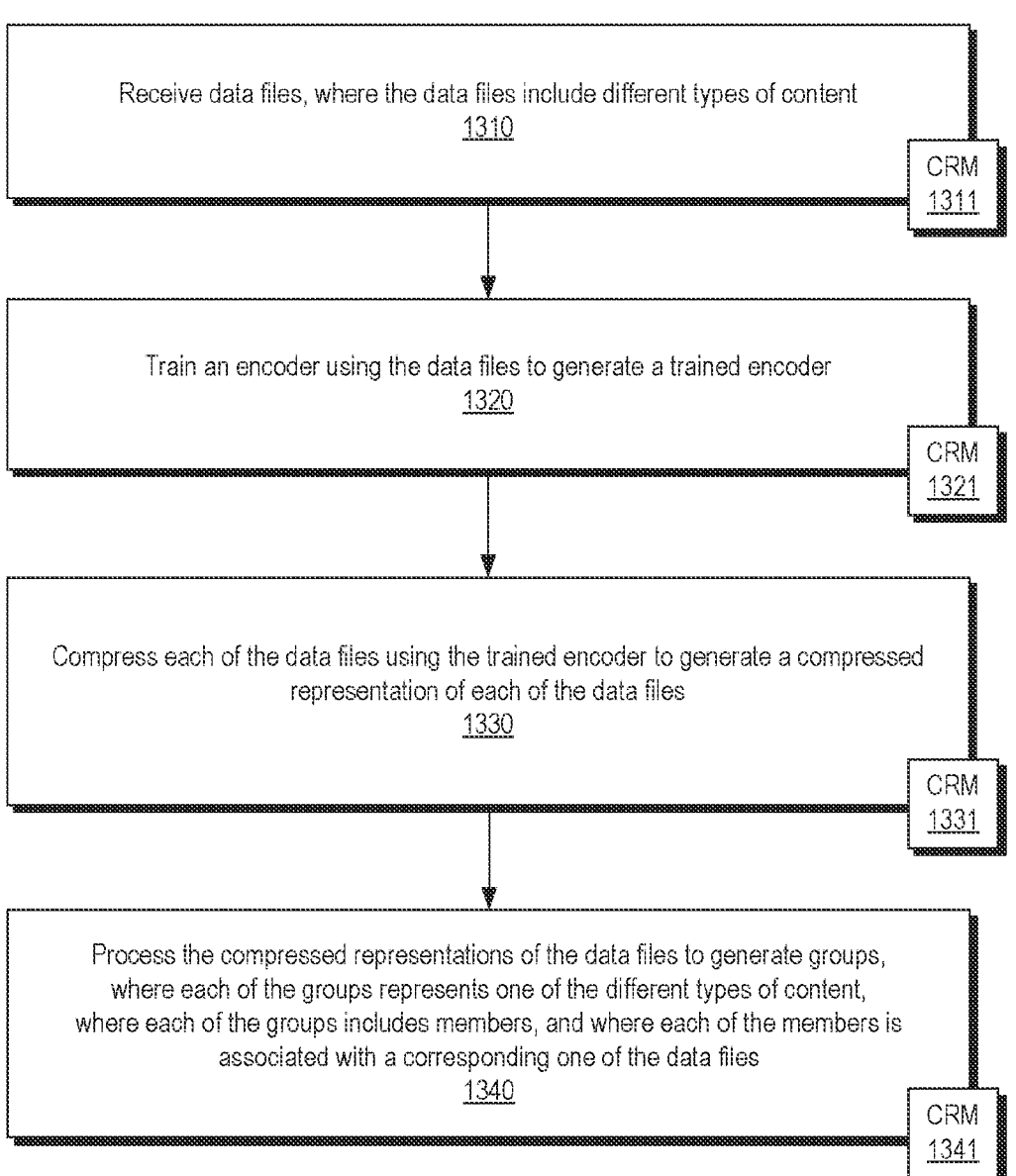
FIG. 13 illustrates an example of a method.

FIG. 13 shows an example of a method 1300 that includes a reception block 1310 for receiving data files, where the data files include different types of content; a train block 1320 for training an encoder using the data files to generate a trained encoder; a compression block 1330 for compressing each of the data files using the trained encoder to generate a compressed representation of each of the data files; and a process block 1340 for processing the compressed representations of the data files to generate groups, where each of the groups represents one of the different types of content, where each of the groups includes members, and where each of the members is associated with a corresponding one of the data files.

The method 1300 is shown in FIG. 13 in association with various computer-readable media (CRM) blocks 1311, 1321, 1331 and 1341. Such blocks generally include instructions suitable for execution by one or more processors (or processor cores) to instruct a computing device or system to perform one or more actions. While various blocks are shown, a single medium may be configured with instructions to allow for, at least in part, performance of various actions of the method 1300. As an example, a computer-readable medium (CRM) may be a computer-readable storage medium that is non-transitory and that is not a carrier wave. As an example, one or more of the blocks 1311, 1321, 1331 and 1341 may be in the form processor-executable instructions, for example, consider the one or more sets of instructions 270 of the system 250 of FIG. 2, etc.

Machine learning (ML) can be considered an artificial intelligence technology where a computational framework can train a machine learning model (ML model) using training data to generate a trained ML model. A trained ML model may be utilized for one or more purposes. For example, consider a predictive trained ML model, a decision making trained ML model, etc.

As to types of machine learning models, consider one or more of a support vector machine (SVM) model, a k-nearest neighbors (KNN) model, an ensemble classifier model, a neural network (NN) model, etc. As an example, a machine learning model can be a deep learning model (e.g., deep Boltzmann machine, deep belief network, convolutional neural network, stacked auto-encoder, etc.), an ensemble model (e.g., random forest, gradient boosting machine, bootstrapped aggregation, AdaBoost, stacked generalization, gradient boosted regression tree, etc.), a neural network model (e.g., radial basis function network, perceptron, back-propagation, Hopfield network, etc.), a regularization model (e.g., ridge regression, least absolute shrinkage and selection operator, elastic net, least angle regression), a rule system model (e.g., cubist, one rule, zero rule, repeated incremental pruning to produce error reduction), a regression model (e.g., linear regression, ordinary least squares regression, stepwise regression, multivariate adaptive regression splines, locally estimated scatterplot smoothing, logistic regression, etc.), a Bayesian model (e.g., naïve Bayes, average one-dependence estimators, Bayesian belief network, Gaussian naïve Bayes, multinomial naïve Bayes, Bayesian network), a decision tree model (e.g., classification and regression tree, iterative dichotomiser 3, C4.5, C5.0, chi-squared automatic interaction detection, decision stump, conditional decision tree, M5), a dimensionality reduction model (e.g., principal component analysis, partial least squares regression, Sammon mapping, multidimensional scaling, projection pursuit, principal component regression, partial least squares discriminant analysis, mixture discriminant analysis, quadratic discriminant analysis, regularized discriminant analysis, flexible discriminant analysis, linear discriminant analysis, etc.), an instance model (e.g., k-nearest neighbor, learning vector quantization, self-organizing map, locally weighted learning, etc.), a clustering model (e.g., k-means, k-medians, expectation maximization, hierarchical clustering, etc.), etc.

As an example, a machine model, which may be a machine learning model, may be built using a computational framework with a library, a toolbox, etc., such as, for example, those of the MATLAB framework (MathWorks, Inc., Natick, Massachusetts). The MATLAB framework includes a toolbox that provides supervised and unsupervised machine learning algorithms, including support vector machines (SVMs), boosted and bagged decision trees, k-nearest neighbor (KNN), k-means, k-medoids, hierarchical clustering, Gaussian mixture models, and hidden Markov models. Another MATLAB framework toolbox is the Deep Learning Toolbox (DLT), which provides a framework for designing and implementing deep neural networks with algorithms, pretrained models, and apps. The DLT provides convolutional neural networks (ConvNets, CNNs) and long short-term memory (LSTM) networks to perform classification and regression on image, time-series, and text data. The DLT includes features to build network architectures such as generative adversarial networks (GANs) and Siamese networks using custom training loops, shared weights, and automatic differentiation. The DLT provides for model exchange various other frameworks.

As an example, a trained ML model (e.g., a trained ML tool that includes hardware, etc.) can be utilized for one or more tasks. As an example, various types of data may be acquired and optionally stored, which may provide for training one or more ML models, for retraining one or more ML models, for further training of one or more ML models, and/or for offline analysis, etc.

As an example, the TENSORFLOW framework (Google LLC, Mountain View, CA) may be implemented, which is an open source software library for dataflow programming that includes a symbolic math library, which can be implemented for machine learning applications that can include neural networks. As an example, the CAFFE framework may be implemented, which is a DL framework developed by Berkeley AI Research (BAIR) (University of California, Berkeley, California). As another example, consider the SCIKIT platform (e.g., scikit-learn), which utilizes the PYTHON programming language. As an example, a framework such as the APOLLO AI framework may be utilized (APOLLO.AI GmbH, Germany). As an example, a framework such as the PYTORCH framework may be utilized (Facebook AI Research Lab (FAIR), Facebook, Inc., Menlo Park, California).

As an example, a system, a workflow, etc., may implement the KERAS framework, which includes an open-source software library that provides a PYTHON interface for artificial neural networks. As an example, the KERAS framework can be utilized as an interface for the TENSOR-FLOW library. The KERAS framework includes implementations of neural-network building blocks such as layers, objectives, activation functions, optimizers, and other tools that can facilitate working with image and text data, for example, for coding in deep neural network code. The KERAS framework includes support for convolutional and recurrent neural networks and utility layers like dropout, batch normalization, and pooling. The KERAS framework can be utilized to implement deep models in various formats (e.g., smartphones (iOS, ANDROID, etc.), on the Internet (e.g., browser, etc.), on a JAVA virtual machine (JVM), etc. The KERAS framework can provide for distributed training of deep-learning models, for example, on clusters of GPUs, TPUs, etc.

As mentioned, the SCIKIT platform may be utilized, for example, consider one or more unsupervised learning features such as restricted Boltzmann machines (RBM), which are unsupervised nonlinear feature learners based on a probabilistic model. In such an example, features extracted by an RBM or a hierarchy of RBMs may provide adequate results when fed into a linear classifier such as a linear SVM or a perceptron. The model makes assumptions regarding the distribution of inputs, for example, that the inputs are either binary values or values between 0 and 1, each encoding the probability that the specific feature would be turned on. The RBM approach aims to maximize the likelihood of the data using a particular graphical model. As an example, stochastic maximum likelihood may be utilized to reduce representations from straying too far from input.

As to autoencoder features, the SCIKIT platform can utilize sknn.ae for training a neural network composed of stacked layers of weights that encode input data (upwards pass) and then decode it again (downward pass). For example, consider a sknn.ae.Layer utilized to specify an upward and downward layer with non-linear activations. As an example, a list of specifications can be provided as layers parameters to the sknn.ae.AutoEncoder constructor. The SCIKIT platform also includes autoencoding transformers features, for example, for unsupervised learning to train weights in each layer where these weights can then be reused in a sknn.mlp.MultiLayerPerceptron for better pre-training and for encoding inputs into an intermediate representation for use in a pipeline, for example, to reduce dimensionality of an input vector using stochastic gradient descent.

As explained, a method such as the method 700 of FIG. 7, the method 1300 of FIG. 13, etc., may implement one or more types of frameworks (or platforms) for training and/or other processing. As an example, a method can include rendering one or more GUIs to a display where, for example, graphical controls can provide for interactions for one or more purposes as may be germane to one or more operations (see, e.g., FIG. 1, FIG. 2, FIG. 3, FIG. 4, etc.).

As an example, a method can include receiving data files, where the data files include different types of content; training an encoder using the data files to generate a trained encoder; compressing each of the data files using the trained encoder to generate a compressed representation of each of the data files; and processing the compressed representations of the data files to generate groups, where each of the groups represents one of the different types of content, where each of the groups includes members, and where each of the members is associated with a corresponding one of the data files.

In such an example, the data files can include digitized document files. For example, consider a natively digital document file and/or a document that is digitized to generate a digitized document file (e.g., via optical scanning, etc.).

As an example, different types of content can include text and images. As an example, a document file can include text content and image content. As an example, an image can be a downhole log image. For example, consider a logging tool that can be deployed in a downhole environment (e.g., via a borehole, etc.) to acquire data, which may be measurement data via one or more types of sensors (e.g., for sound, electromagnetic energy, chemical phenomena, physical phenomena, etc.).

As an example, digitized document files can include images where the images can include one or more of at least one downhole log image, at least one micrograph of a geologic sample, at least one outcrop image, at least one satellite image, at least one airborne drone or airplane image, etc.

As an example, at least a portion of data files can include corresponding metadata. For example, an image may be captured using a camera or other image capture tool that imparts information such as location, time, etc. Such information can be metadata that is stored in association with a data file and/or as part of the data file. As an example, metadata may be in a format that is not an image format such that an image can be rendered without the metadata (e.g., consider pixels and metadata where pixels can be rendered with rendering of the metadata). As an example, a method can include rendering using metadata, searching using metadata, labeling using metadata, etc. As explained, an OCR process may be implemented to extract text from an image where the text may be stored in association with the image and/or metadata. Such text and/or metadata may be utilized for one or more purposes (e.g., rendering, searching, labeling, etc.).

As an example, a method can include rendering a visual representation of groups to a graphical user interface (GUI) on a display. In such an example, the method can include receiving a command via the graphical user interface (GUI) and altering the visual representation. As an example, consider a command that is a search command that instructs a computing system to perform a search on members of the groups.

As an example, a method can include receiving data files, where the data files include different types of content; training an encoder using the data files to generate a trained encoder; compressing each of the data files using the trained encoder to generate a compressed representation of each of the data files; and processing the compressed representations of the data files to generate groups, where each of the groups represents one of the different types of content, where each of the groups includes members, and where each of the members is associated with a corresponding one of the data files. In such an example, the method can include storing a data structure of groups to a storage medium, where the data structure associates each of the members of the groups with a corresponding one of the data files. In such an example, the data structure may be searchable and/or otherwise utilized by a search engine that can generate search results responsive to a query, which may be a machine generated query, an input query, etc.

As an example, a search engine may be operable in a triggered manner, optionally automatically responsive to an event. For example, consider the system 300 of FIG. 3, the system 400 of FIG. 4, etc., where an event that may be part of a workflow can trigger a search using a search engine. In such an example, consider a workflow that receives image data where a search is performed responsive to receipt of the image data using at least a portion of the image data. As to a field example, consider the outcrop interpretation block 316 of the system 300 where a user can capture an image of an outcrop where at least a portion the image is then utilized for performing a search. In such an example, the results of the search may be rendered to an output space such as, for example, the output space 602 and/or the output space 603 where the results may include other images that may include optical images, seismic images, etc. Such an approach can facilitate interpretation, structural modeling, physical property assessment, etc.

As an example, a downhole tool may be deployed via a wireline or other technology where data received via the downhole tool may be utilized to augment an output space, perform a search, etc. For example, consider a live search feature where log data (e.g., graphs, plots, images, etc.) may be acquired with respect to measured depth in a borehole where search results based on such log data are automatically highlighted in a GUI or GUIs. In such an example, an output space such as the output space 602 and/or 603 may increase brightness or utilize one or more other effects to highlight relevant members in one or more clusters. In such an example, a user may pre-select types of content to search (e.g., as part of a data structure or data structures). As explained, a search may be hybrid, for example, in that document content (e.g., digitized image, extracted text, etc.) and metadata may be utilized. As an example, upon completion of a survey (e.g., a wireline survey, a seismic survey, a drilling survey, etc.), results may be generated that can allow a user to assess whether one or more analogues exist. In such an example, the user may interact with a GUI or GUIs to select and review an analogue, which may facilitate work on a project, etc.

As an example, a method can include processing where such processing can include performing an orthogonal linear transformation of compressed representations of data files to generate a transformed representation of the compressed representations of the data files. In such an example, consider performing the orthogonal linear transformation at least in part by performing a principal component analysis (PCA).

As an example, a method can include processing that includes performing a nonlinear dimensionality reduction process on a transformed representation of compressed representations of data files to generate a dimensionality reduced representation of the transformed representation. In such an example, consider a method that includes performing the nonlinear dimensionality reduction process at least in part by performing a t-distributed stochastic neighbor embedding (t-SNE) process.

As an example, a method can include processing that includes performing a clustering process on a dimensionality reduced representation to generate clusters. For example, consider performing a clustering process that includes performing a k-means clustering process. In such an example, the method may include automatically determining a value for a k parameter of the k-means clustering process. For example, consider implementing the elbow method for automatically determining the value for the k parameter.

As an example, a system can include one or more processors; memory accessible to at least one of the one or more processors; processor-executable instructions stored in the memory and executable to instruct the system to: receive data files, where the data files include different types of content; train an encoder using the data files to generate a trained encoder; compress each of the data files using the trained encoder to generate a compressed representation of each of the data files; and process the compressed representations of the data files to generate groups, where each of the groups represents one of the different types of content, where each of the groups includes members, and where each of the members is associated with a corresponding one of the data files.

As an example, one or more computer-readable storage media can include processor-executable instructions to instruct a computing system to: receive data files, where the data files include different types of content; train an encoder using the data files to generate a trained encoder; compress each of the data files using the trained encoder to generate a compressed representation of each of the data files; and process the compressed representations of the data files to generate groups, where each of the groups represents one of the different types of content, where each of the groups includes members, and where each of the members is associated with a corresponding one of the data files.

As an example, a computer program product can include computer-executable instructions to instruct a computing system to perform one or more methods such as, for example, the method 700 of FIG. 7, the method 1300 of FIG. 13, etc.

As an example, a computer program product can include one or more computer-readable storage media that can include processor-executable instructions to instruct a computing system to perform one or more methods and/or one or more portions of a method.

Figure 14:
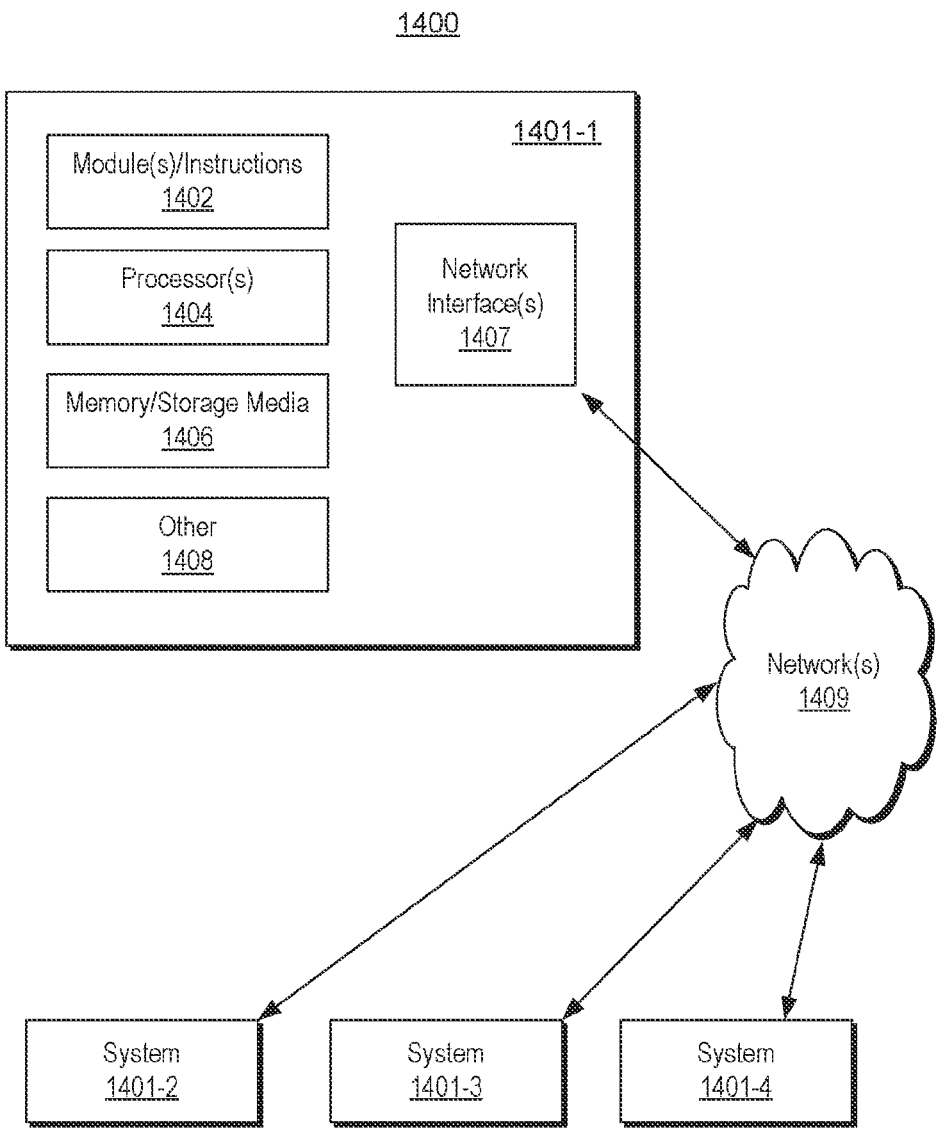
FIG. 14 illustrates examples of computer and network equipment.

In some embodiments, a method or methods may be executed by a computing system. FIG. 14 shows an example of a system 1400 that can include one or more computing systems 1401-1, 1401-2, 1401-3 and 1401-4, which may be operatively coupled via one or more networks 1409, which may include wired and/or wireless networks.

As an example, a system can include an individual computer system or an arrangement of distributed computer systems. In the example of FIG. 14, the computer system 1401-1 can include one or more modules 1402, which may be or include processor-executable instructions, for example, executable to perform various tasks (e.g., receiving information, requesting information, processing information, simulation, outputting information, etc.).

As an example, a module may be executed independently, or in coordination with, one or more processors 1404, which is (or are) operatively coupled to one or more storage media 1406 (e.g., via wire, wirelessly, etc.). As an example, one or more of the one or more processors 1404 can be operatively coupled to at least one of one or more network interface 1407. In such an example, the computer system 1401-1 can transmit and/or receive information, for example, via the one or more networks 1409 (e.g., consider one or more of the Internet, a private network, a cellular network, a satellite network, etc.).

As an example, the computer system 1401-1 may receive from and/or transmit information to one or more other devices 1408, which may be or include, for example, one or more of the computer systems 1401-2, etc. A device may be located in a physical location that differs from that of the computer system 1401-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 1406 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 15:
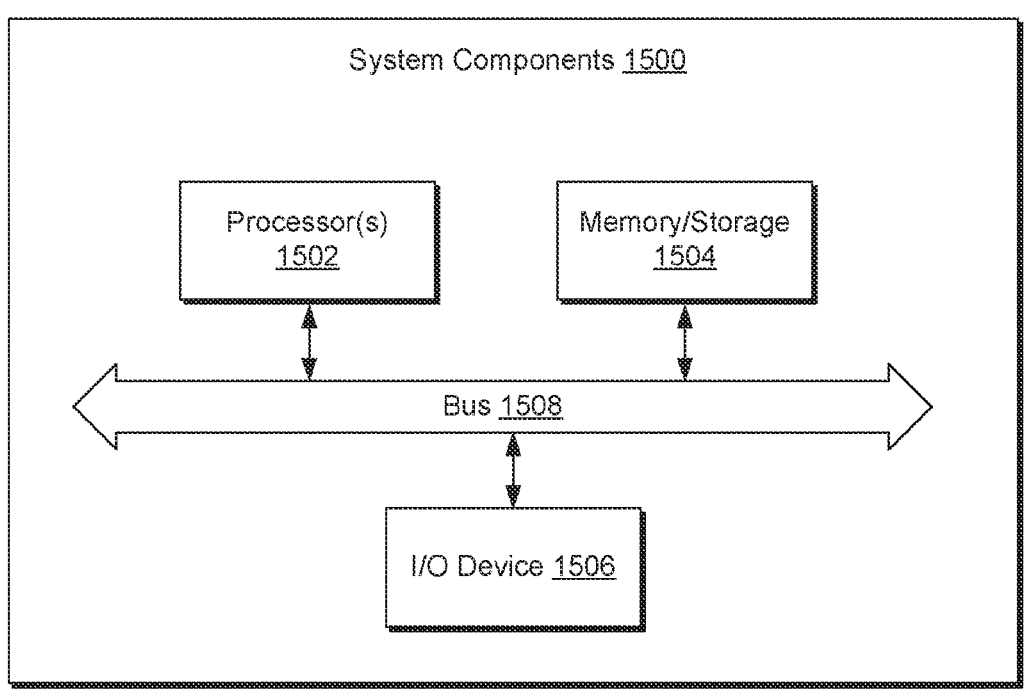
FIG. 15 illustrates example components of a system and a networked system.
Figure 15:
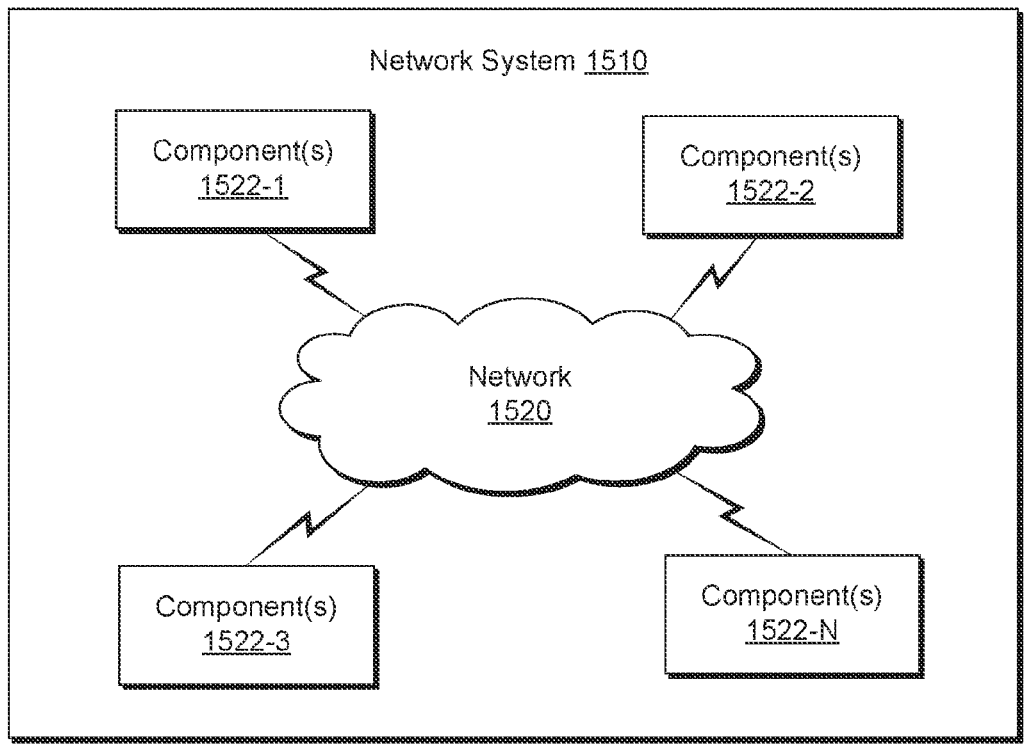

FIG. 15 shows components of an example of a computing system 1500 and an example of a networked system 1510 with a network 1520. The system 1500 includes one or more processors 1502, memory and/or storage components 1504, one or more input and/or output devices 1506 and a bus 1508. In an example embodiment, instructions may be stored in one or more computer-readable media (e.g., memory/storage components 1504). Such instructions may be read by one or more processors (e.g., the processor(s) 1502) via a communication bus (e.g., the bus 1508), which may be wired or wireless. The one or more processors may execute such instructions to implement (wholly or in part) one or more attributes (e.g., as part of a method). A user may view output from and interact with a process via an I/O device (e.g., the device 1506). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1510. The network system 1510 includes components 1522-1, 1522-2, 1522-3, . . . 1522-N. For example, the components 1522-1 may include the processor(s) 1502 while the component(s) 1522-3 may include memory accessible by the processor(s) 1502. Further, the component(s) 1522-2 may include an I/O device for display and optionally interaction with a method. A network 1520 may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:
   receiving data files, wherein the data files comprise different types of content collected from a workspace framework tailored to a geologic environment and processed using a client layer, an application layer, a source or source of site information including offset well information, a storage layer, and an artificial intelligence layer, wherein the different types of content comprise text and images, wherein the images comprise at least one downhole log image, and/or wherein the images comprise at least one micrograph of a geologic sample;
   training an encoder using the data files to generate a trained encoder;
   compressing each of the data files using the trained encoder to generate a compressed representation of each of the data files; and
   processing the compressed representations of the data files to generate groups, wherein each of the groups represents one of the different types of content, wherein each of the groups comprises members, and wherein each of the members is associated with a corresponding one of the data files.

2. The method of claim 1, wherein the data files comprise digitized document files.

3. The method of claim 1, wherein at least a portion of the data files comprise corresponding metadata.

4. The method of claim 1, comprising rendering a visual representation of the groups to a graphical user interface on a display.

5. The method of claim 4, comprising receiving a search command that instructs a computing system to perform a search on the members of the groups.

6. The method of claim 1, comprising storing a data structure of the groups to a storage medium, wherein the data structure associates each of the members of the groups with a corresponding one of the data files.

7. The method of claim 1, wherein the processing comprises performing an orthogonal linear transformation of the compressed representations of the data files to generate a transformed representation of the compressed representations of the data files.

8. The method of claim 7, wherein the performing the orthogonal linear transformation comprises performing a principal component analysis (PCA).

9. The method of claim 7, wherein the processing further comprises performing a nonlinear dimensionality reduction process on the transformed representation of the compressed representations of the data files to generate a dimensionality reduced representation of the transformed representation.

10. The method of claim 9, wherein the performing the nonlinear dimensionality reduction process comprises performing a t-distributed stochastic neighbor embedding (t-SNE) process.

11. The method of claim 9, wherein the processing further comprises performing a clustering process on the dimensionality reduced representation to generate clusters, optionally wherein the performing a clustering process comprises performing a k-means clustering process, and optionally comprising automatically determining a value for a k parameter of the k-means clustering process.

12. A system comprising:
   one or more processors;
   memory accessible to at least one of the one or more processors;
   processor-executable instructions stored in the memory and executable to instruct the system to:

receive data files, wherein the data files comprise different types of content collected from a workspace framework tailored to a geologic environment and processed using a client layer, an application layer, a source or source of site information including offset well information, a storage layer, and an artificial intelligence layer, wherein the different types of content comprise text and images, wherein the images comprise at least one downhole log image, and/or wherein the images comprise at least one micrograph of a geologic sample;

train an encoder using the data files to generate a trained encoder;

compress each of the data files using the trained encoder to generate a compressed representation of each of the data files; and process the compressed representations of the data files to generate groups, wherein each of the groups represents one of the different types of content, wherein each of the groups comprises members, and wherein each of the members is associated with a corresponding one of the data files.

13. A non-transitory computer readable medium storing computer-executable instructions to instruct a computing system:

receive data files, wherein the data files comprise different types of content collected from a workspace framework tailored to a geologic environment and processed using a client layer, an application layer, a source or source of site information including offset well information, a storage layer, and an artificial intelligence layer, wherein the different types of content comprise text and images, wherein the images comprise at least one downhole log image, and/or wherein the images comprise at least one micrograph of a geologic sample;

train an encoder using the data files to generate a trained encoder;

compress each of the data files using the trained encoder to generate a compressed representation of each of the data files; and process the compressed representations of the data files to generate groups, wherein each of the groups represents one of the different types of content, wherein each of the groups comprises members, and wherein each of the members is associated with a corresponding one of the data files.

* * * * *